(12) United States Patent
Sakuma

(10) Patent No.: US 8,891,201 B2
(45) Date of Patent: Nov. 18, 2014

(54) INFORMATION PROCESSING UNIT WITH CURVILINEAR TRACK

(71) Applicant: Fujitsu Limited, Kawasaki (JP)

(72) Inventor: Ichirou Sakuma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/100,119

(22) Filed: Dec. 9, 2013

(65) Prior Publication Data

US 2014/0198408 A1 Jul. 17, 2014

(51) Int. Cl.
*G11B 15/68* (2006.01)
*G11B 17/22* (2006.01)

(52) U.S. Cl.
CPC .......... *G11B 15/6885* (2013.01); *G11B 17/221* (2013.01); *G11B 15/6815* (2013.01)
USPC ........................................................ 360/92.1

(58) Field of Classification Search
CPC .................................................... G11B 17/225
USPC .................. 360/92.1, 98.04–98.06; 369/30.4, 369/30.41–30.49
See application file for complete search history.

(56) References Cited

U.S. PATENT DOCUMENTS

| 5,415,471 A | * | 5/1995 | Dalziel ........................ 312/9.46 |
| 5,781,368 A | | 7/1998 | Kotaki et al. |
| 2005/0080993 A1 | | 4/2005 | Shiraishi et al. |

FOREIGN PATENT DOCUMENTS

| JP | 07-44829 | 2/1995 |
| JP | 2005-116105 | 4/2005 |

* cited by examiner

*Primary Examiner* — Joseph Feild
*Assistant Examiner* — Gustavo Polo
(74) *Attorney, Agent, or Firm* — Fujitsu Patent Center

(57) ABSTRACT

A medium processing device includes: an information processor that performs at least one of record processing and read processing of information to each of recording media; a magazine that includes storage units which store the recording media, respectively, the storage units which adjoin each other being rotatably connected via a hinge member; a conveyance route that guides the magazine; a first introduction ejector that introduces or ejects the magazine; a second introduction ejector that introduces or ejects the magazine; a driving device that conveys the magazine introduced from any one of the first introduction ejector and the second introduction ejector, to a position where the magazine is capable of being ejected from another one of the first introduction ejector and the second introduction ejector; and a medium mover that moves each of the recording media between each of the storage units of the conveyed magazine and the information processor.

7 Claims, 18 Drawing Sheets

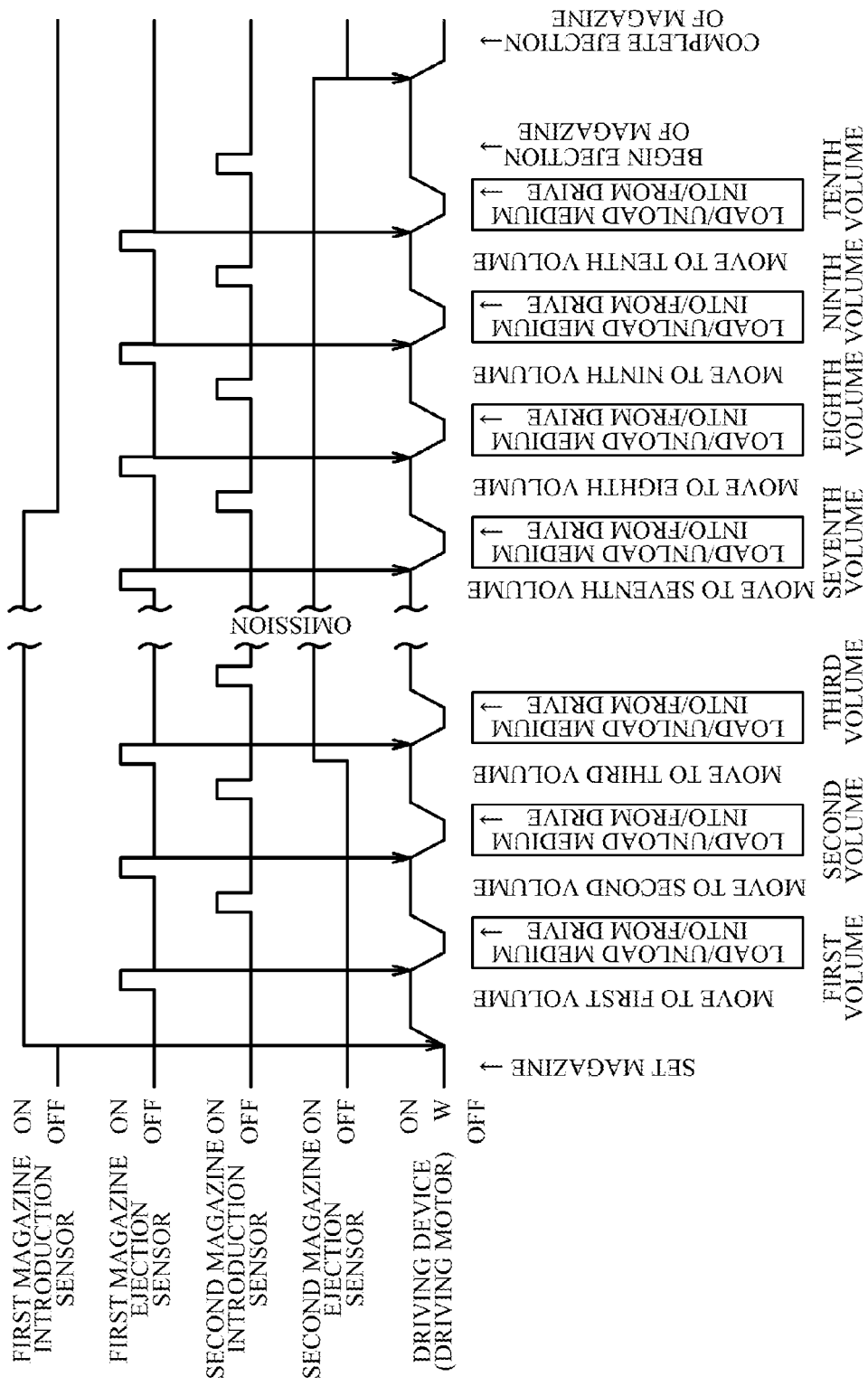

INFORMATION PROCESSING UNIT WITH CURVILINEAR TRACK

CROSS-REFERENCE TO RELATED APPLICATIONS

This application is based upon and claims the benefit of priority of the prior Japanese Patent Application No. 2013-003098 filed on Jan. 11, 2013, the entire contents of which are incorporated herein by reference.

FIELD

A certain aspect of the embodiments is related to a medium processing device.

BACKGROUND

In recent years, improvement in a storage capacity in a magnetic recording device using a medium, such as magnetic tape, is desired depending on improvement in the information processing ability required of an electronic device. For example, in a magnetic tape device, a device that continuously processes a plurality of magnetic tape cartridges by taking advantage of the feature of the magnetic tape cartridge as an interchangeable recording medium is strongly desired. From such a viewpoint, the offer of the magnetic tape device equipped with a compact cartridge auto-loader superior in operability is desired.

Such a magnetic tape device is disclosed by Japanese Laid-open Patent Publication No. 7-44829 (Patent Document 1). In the magnetic tape device disclosed by Patent Document 1, a cartridge auto-loader is attached to the front of a device which processes information. The cartridge auto-loader includes an elevating unit for moving up and down a magazine which has stored a plurality of magnetic tape cartridges, and a feeding mechanical unit for inserting the magnetic tape cartridges stored in the magazine into the main body of the device. In the cartridge auto-loader equipped with such composition, the elevating unit moves the magazine up and down, and arranges a magnetic tape cartridge to be accessed on an accessible position by the feeding mechanical unit. Then, the feeding mechanical unit conveys the magnetic tape cartridge to the main body of the device and inserts the magnetic tape cartridge into the main body of the device, and the main body of the device performs reading process and writing process to the magnetic tape cartridge.

SUMMARY

A medium processing device disclosed herein includes: an information processor configured to perform at least one of record processing and read processing of information to each of recording media; a magazine configured to include a plurality of storage units which store the recording media, respectively, the storage units which adjoin each other being rotatably connected via a hinge member; a curved conveyance route configured guide the magazine; a first introduction ejector configured to introduce or eject the magazine, and to be provided on one end of the conveyance route; a second introduction ejector configured to introduce or eject the magazine, and to be provided on another end of the conveyance route; a driving device configured to convey, along the conveyance route, the magazine introduced from any one of the first introduction ejector and the second introduction ejector, to a position where the magazine is capable of being ejected from another one of the first introduction ejector and the second introduction ejector; and a medium mover configured to move each of the recording media between each of the storage units of the conveyed magazine and the information processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a time chart illustrating an example of the operation of the cartridge auto-loader.

DESCRIPTION OF EMBODIMENTS

In the conventional cartridge auto-loader, since the magazine is moved up and down by the elevating unit, it requires time when the conventional cartridge auto-loader ejects the magazine. Specifically, the magnetic tape cartridges stored into the magazine is in a laminated state. When an access target is changed in order from the magnetic tape cartridge located in a lower end, the magnetic tape cartridge located in an upper end is the last access target. After the processing to the magnetic tape cartridge located in the upper end, in order to remove the magazine, the magazine has to be returned to an initial state. That is, the elevating unit has to be reversed to remove the magazine, and this processing has taken time.

A description will now be given of an embodiment of the present invention with reference to attached drawings. It should be noted that a size and ratio of each element do not correspond to the actual ones in some drawings. Also, some elements which exist in fact may be omitted in some drawings for convenience of explanation.

Embodiment

Figure 1:
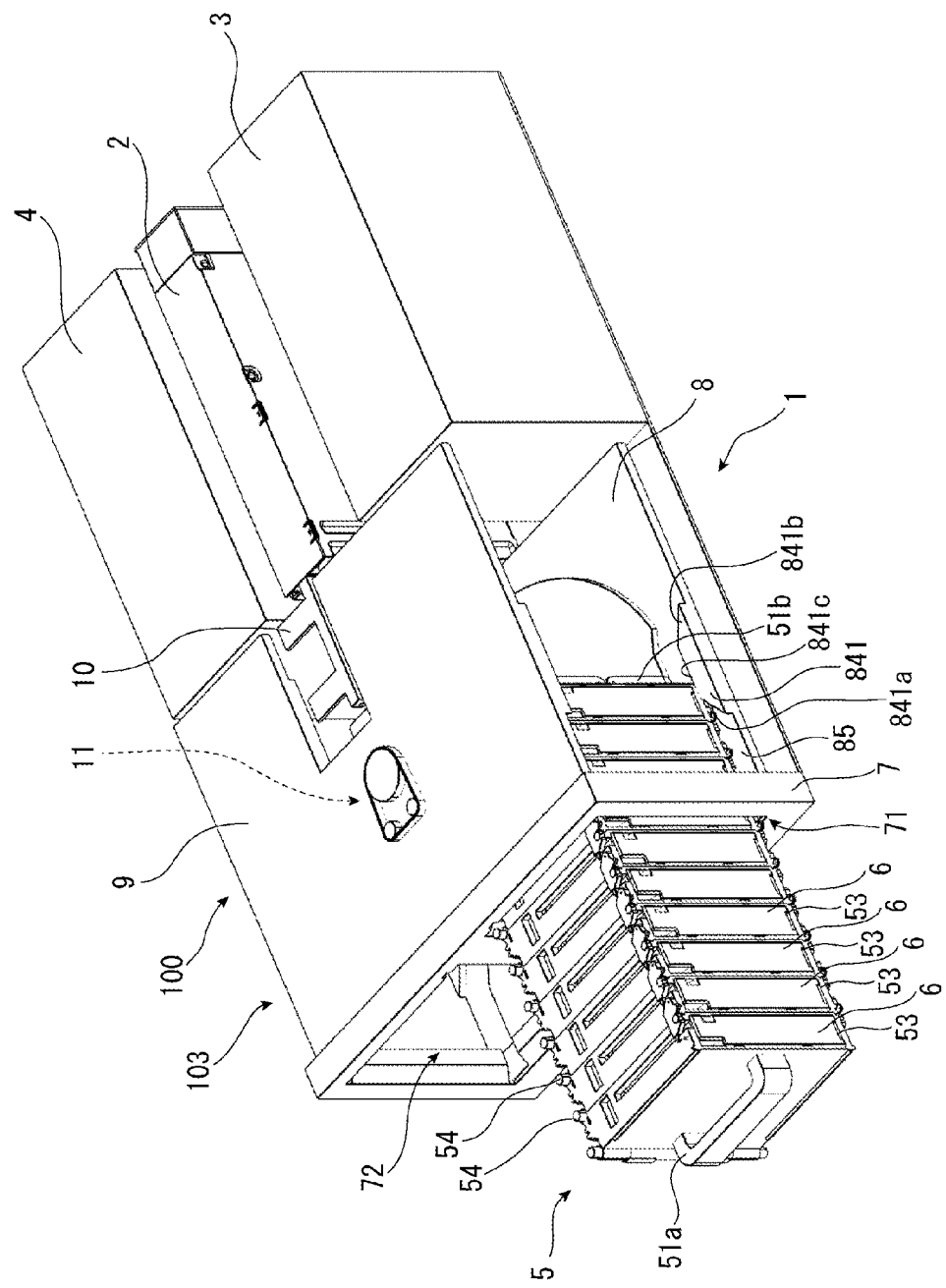
FIG. 1 is a perspective view of a medium processing device equipped with a cartridge auto-loader as an example of an embodiment.
Figure 2:
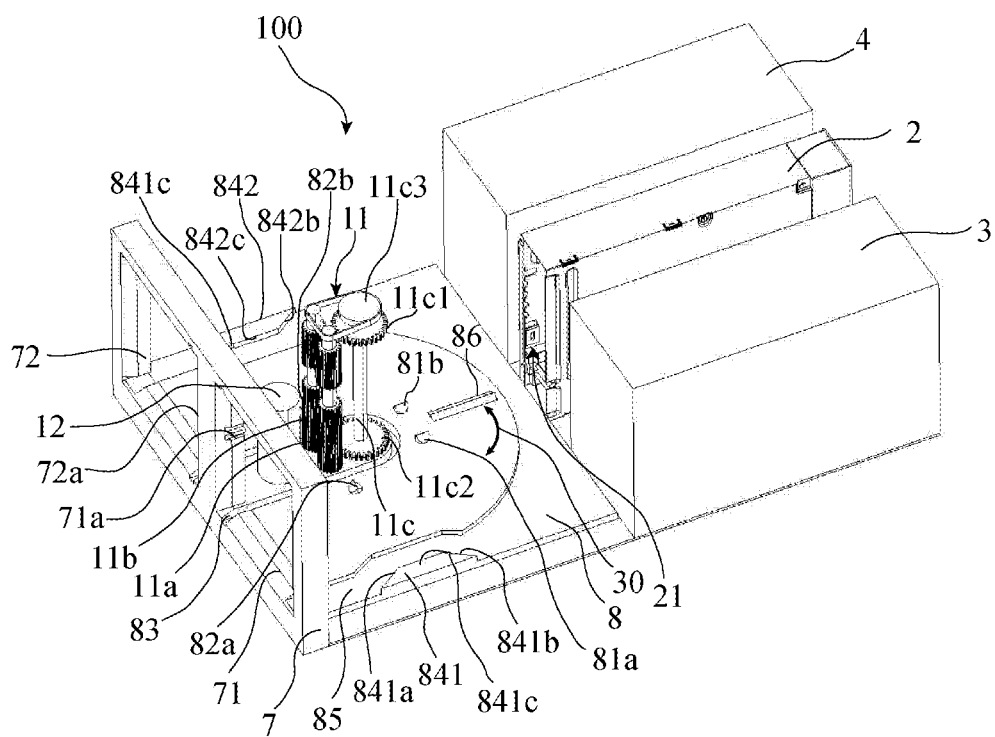
FIG. 2 is a perspective view illustrating internal constitution of the cartridge auto-loader when an upper guide of the cartridge auto-loader as the example of the embodiment is removed.

FIG. 1 is a perspective view of a magnetic tape device 1 equipped with a cartridge auto-loader 100 as an example of an embodiment. FIG. 2 is a perspective view illustrating internal constitution of the cartridge auto-loader 100 when an upper guide 9 of the cartridge auto-loader 100 as the example of the embodiment is removed.

The magnetic tape device 1 as an example of a medium processing device is a processing device which performs processing such as writing and reading of data to a plurality of recording media (hereafter referred to as "media") 6. The magnetic tape device 1 is, for example, connected to a host device (i.e., a higher device) via a communication line, and performs data-access processing to the media 6 according to a request from the host device. In the present embodiment, magnetic tapes are used as the media 6, and well-known recording media such as magnetic disks can be employed as the media 6.

The present embodiment indicates an example in which a tape cartridge which builds in the magnetic tape is used as each medium 6.

The medium 6 incorporates the magnetic tape rolled by a reel, and is configured to be able to draw the magnetic tape from a drawer slot. In the magnetic tape device 1, a magazine 5 which stores the one or more medium 6 is attached to the cartridge auto-loader 100, and the magazine 5 is conveyed by the cartridge auto-loader 100. Then, as illustrated in FIG. 1, a tape drive 2 performs data access to the conveyed medium 6. The magnetic tape device 1 as the example of the medium processing device includes the tape drive 2 corresponding to an information processor. The tape drive 2 performs at least one of record processing and reading processing of information to the medium 6. The magnetic tape device 1 has the magazine 5 which includes a plurality of storage units (i.e., magazine cells) 53 storing the media 6, respectively, and in which adjoining magazine cells 53 are rotatably connected to each other via a hinge member. A connecting shaft 54, a first hinge tube 547 and a second hinge tube 548 as described later are included in the hinge member. The magnetic tape device 1 includes a curved conveyance route 30 which guides the magazine 5, in the cartridge auto-loader 100. The conveyance route 30 is formed with a connecting shaft guide groove 83 and a connecting hook guide groove 85 provided on a lower guide 8, and grooves corresponding these grooves provided on an upper guide 9. A first introduction ejector 71 of the magazine 5 is provided on one end of the conveyance route 30. A second introduction ejector 72 of the magazine 5 is provided on another end of the conveyance route 30. The cartridge auto-loader 100 with which the magnetic tape device 1 is equipped is equipped with a driving device 11 of the magazine 5. The driving device 11 conveys the magazine 5 introduced from any one of the first introduction ejector 71 and the second introduction ejector 72, to a position where the magazine 5 can be ejected from another one of the first introduction ejector 71 and the second introduction ejector 72 along the conveyance route 30. The magnetic tape device 1 is equipped with a feeder mechanism 10 used as a medium mover which moves a recording medium between the magazine cell 53 of the conveyed magazine 5 and the tape drive 2. In the following description, the magazine 5 is explained in detail, and then the constitution of the magnetic tape device 1 is explained in detail.

Figure 3:
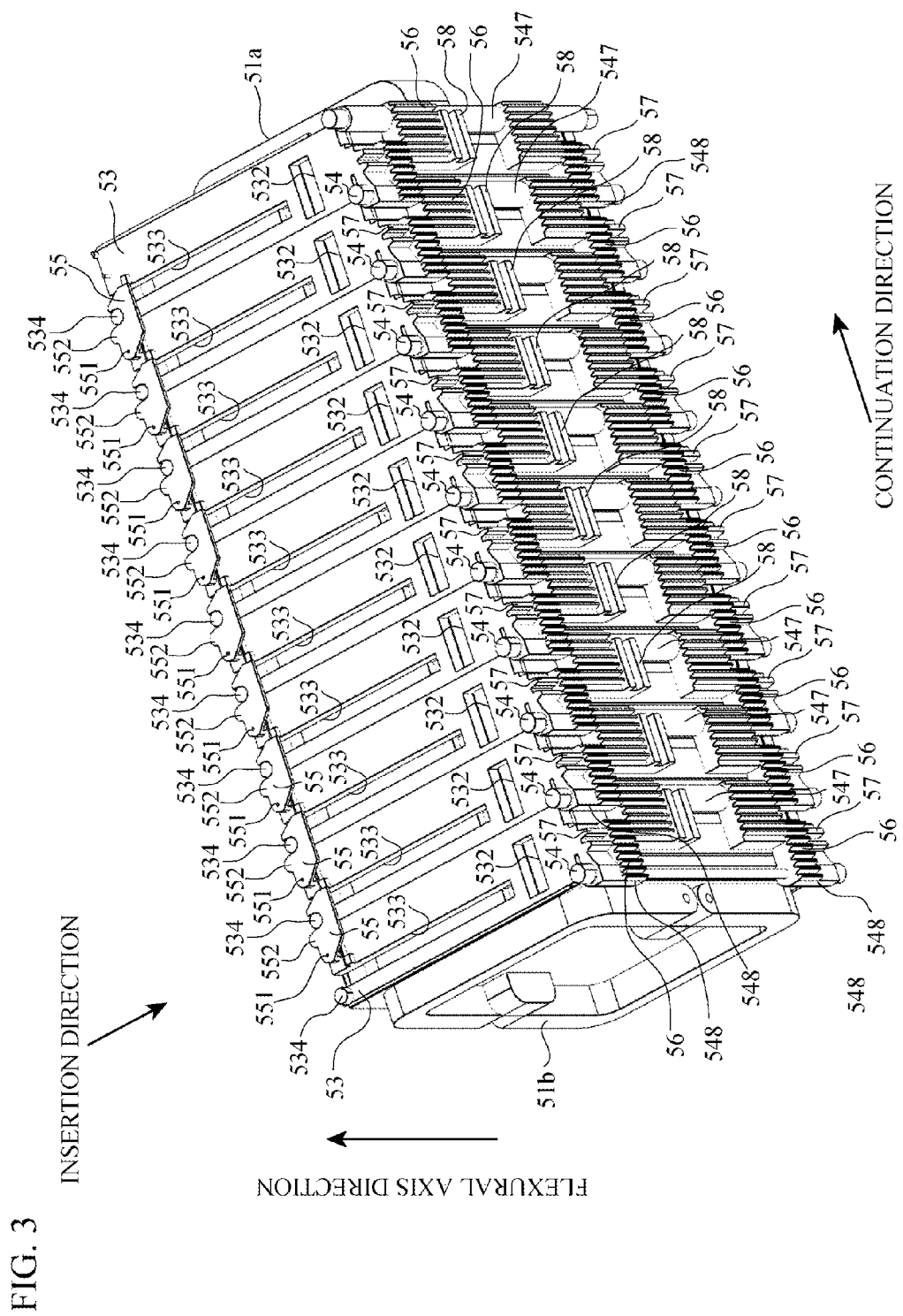
FIG. 3 is a perspective view illustrating a magazine as the example of the embodiment.
Figure 4:
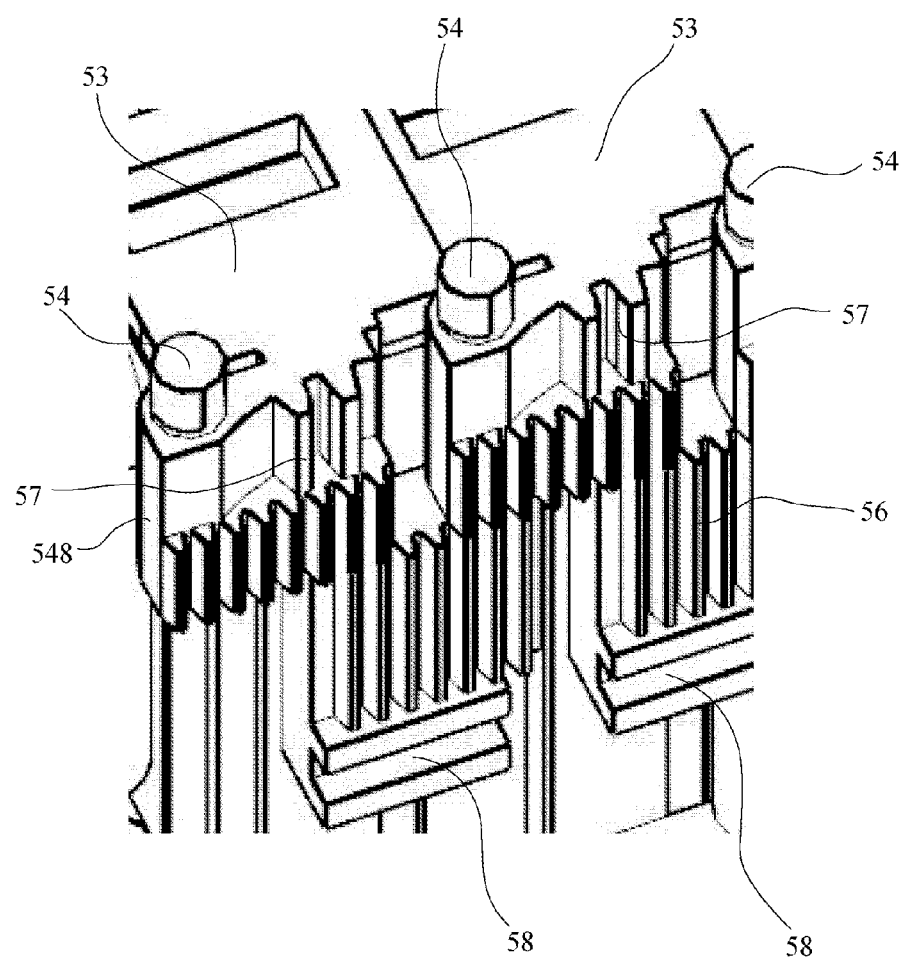
FIG. 4 is an enlarged explanatory diagram illustrating rack gears, rotary gears and incorrect introduction prevention keys which the magazine includes as the example of the embodiment.
Figure 5:
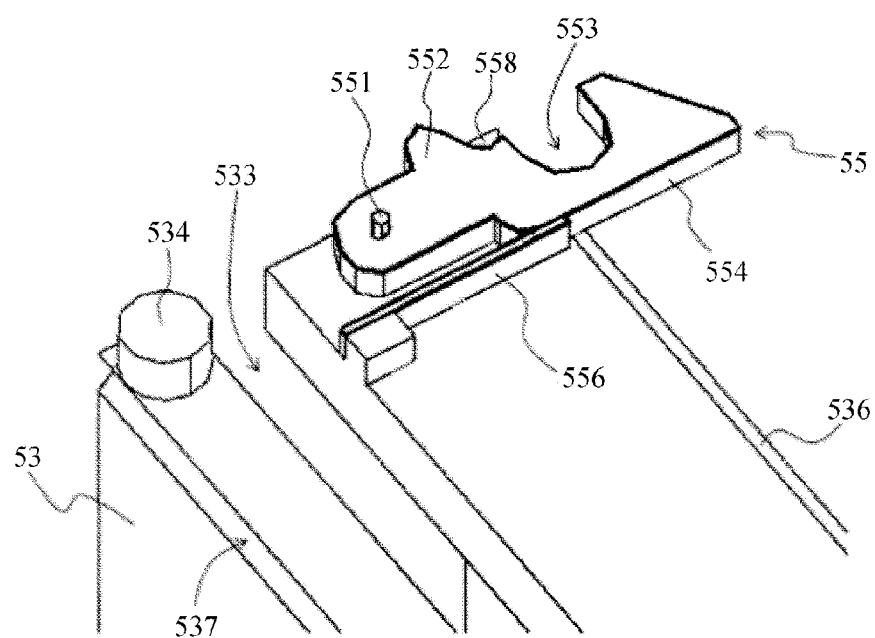
FIG. 5 is a partial perspective view illustrating the constitution of a connecting hook of the magazine as the example of the embodiment.
Figure 6:
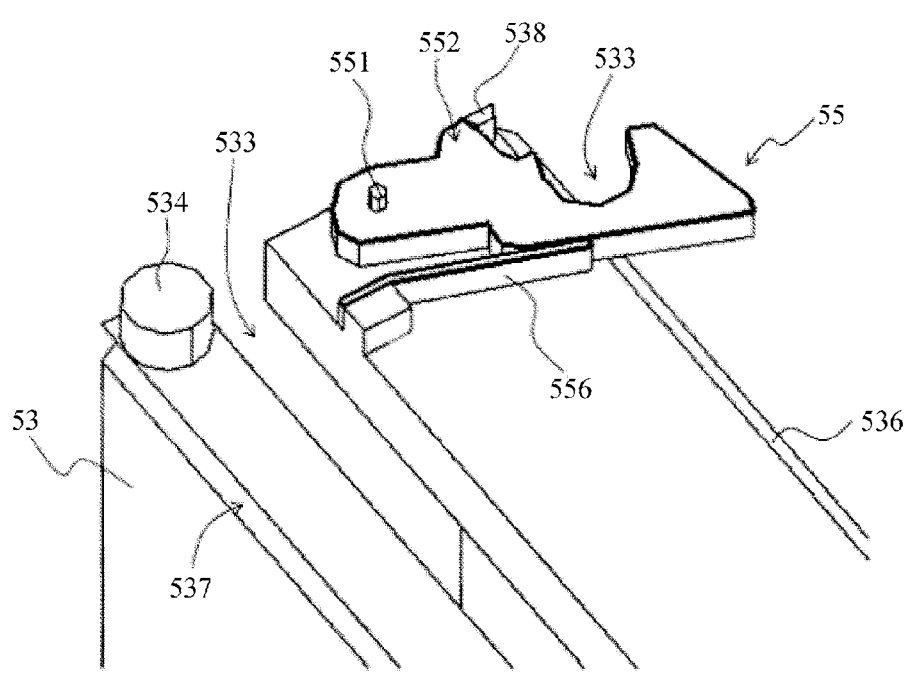
FIG. 6 is a partial perspective view illustrating the constitution of the connecting hook of the magazine as the example of the embodiment.
Figure 7:
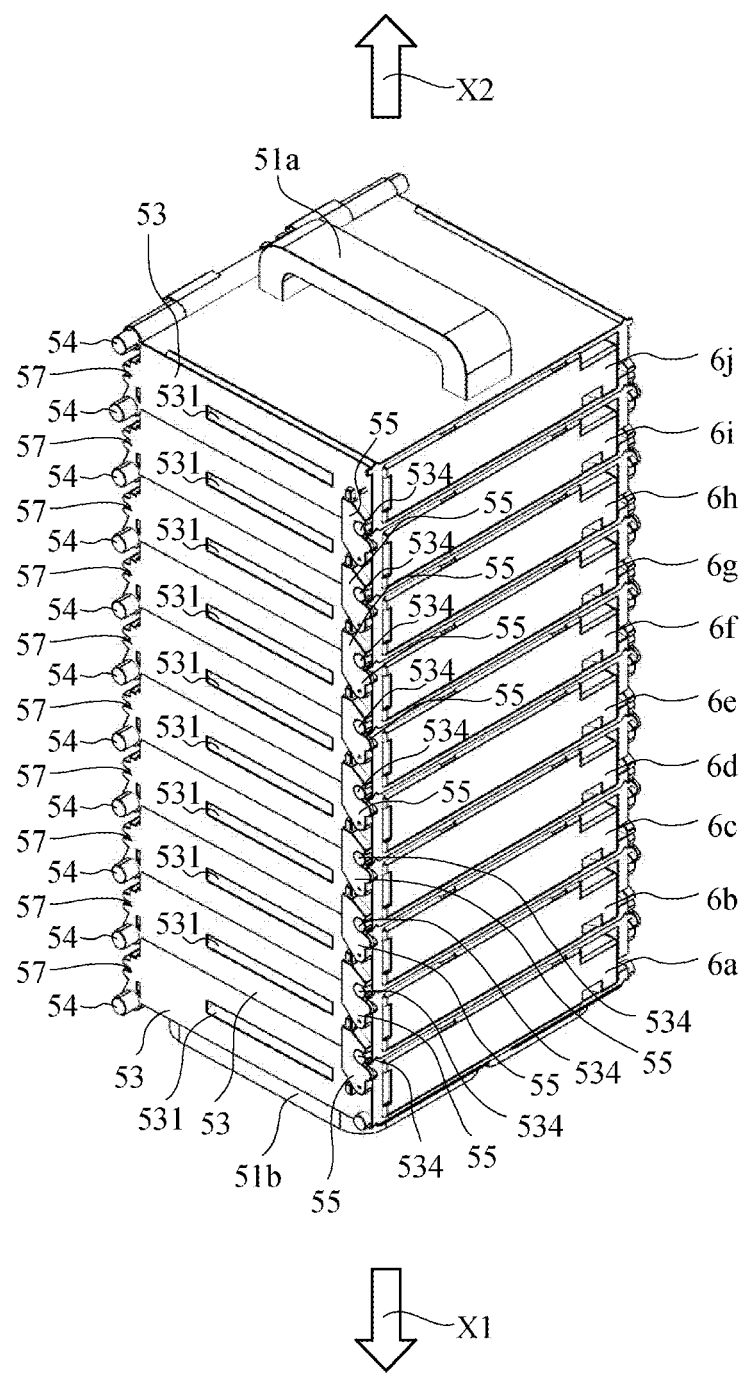
FIG. 7 is a perspective view illustrating a state where the magazine is stood as the example of the embodiment.

[Magazine] FIG. 3 is a perspective view illustrating the magazine 5 as the example of the embodiment. FIG. 4 is an enlarged explanatory diagram illustrating rack gears 56, rotary gears 57 and incorrect introduction prevention keys 58 which the magazine 5 includes as the example of the embodiment. FIGS. 5 and 6 are partial perspective views illustrating the constitution of a connecting hook 55 of the magazine 5 as the example of the embodiment. FIG. 7 is a perspective view illustrating a state where the magazine 5 is stood as the example of the embodiment.

The magazine 5 includes the plurality of magazine cells 53. The magazine 5 illustrated in FIG. 3 has 10 magazine cells 53 which are the storage units storing the media 6, respectively. The adjusting magazine cells 53 are rotatably connected to each other via the connecting shaft 54, the first hinge tube 547 and the second hinge tube 548 corresponding to the hinge member. The magazine 5 is a portable-type storage device which is conveyed in a state where the one or more medium 6 is stored in the magazine cell 53, and which is stored into the cartridge auto-loader 100. A first handle 51a is provided on a magazine cell 53 located in one end of the connected magazine 5. A second handle 51b is provided on a magazine cell 53 located in another end of the connected magazine 5. The second handle 51b is composed of two handle members which can be opened and closed freely. When a user lifts the magazine 5, the two handle members are used in a raised and closed state. On the other hand, when the user does not lift the magazine 5, the two handle members are opened in a fallen state. The two handle members in the fallen state serves as a pedestal having a plane. Therefore, the magazine 5 can be stood by arranging the second handle 51b in a bottom side, as illustrated in FIG. 7. The magazine 5 can be introduced into the conveyance route 30 which the cartridge auto-loader 100 includes, from any direction of arrows X1 and X2 in FIG. 7. The first handle 51a may be an opening-and-closing type handle as well as the second handle 51b.

The magazine cell 53 is a box which can store one medium 6, and has an outer shape which is mostly similar to the medium 6 and is composed of rectangular thick plates. In the magazine 5, the magazine cells 53 are sequentially arranged in a board thickness direction thereof, i.e., in a direction along a rotary shaft of the reel of the stored medium 6. In the following description, a direction, in which the magazine cells 53 in the magazine 5 continue, which goes to another end from the one end on which the second handle 51b is provided is called a continuation direction (see FIG. 3). In the following description, two surfaces opposite to the continuation direction in magazine cells 53 are called the side surfaces for convenience.

An insertion slot for inserting and pulling the medium 6 is provided on a whole surface of a long rectangle in the magazine cell 53. The medium 6 is inserted into the insertion slot from a surface opposite to the surface on which the drawer slot of the magnetic tape is formed. In the following description, a side in which the insertion slot in the magazine cell 53 is formed is called a front surface for convenience. In addition, a surface opposite to the front surface is called a rear surface for convenience. In the magazine cell 53, a direction in which the medium 6 is inserted from the insertion slot is called an insertion direction. Moreover, in the magazine 5, a direction perpendicular to the continuation direction and the insertion direction is called a flexural axis direction (see FIG. 3).

Referring to FIG. 7, in the magazine cell 53, a positioning groove 531 which is fitted to a positioning block 86 of a housing 103 mentioned later is formed on one of two surfaces parallel to both of the above-mentioned continuation direction and the above-mentioned insertion direction. In the following description, the surface on which the positioning groove 531 in the magazine cell 53 is formed is called a bottom surface for convenience. In addition, a surface opposite to the bottom surface is called a top surface for convenience.

In addition, referring to FIG. 3, a feeder passing groove 533 and a fixing notch 532 are formed on the top surface of each magazine cell 53. When the medium 6 is moved between the magazine cell 53 and the tape drive 2, the feeder passing groove 533 is a groove for guiding the feeder mechanism 10, and is formed so as to extend from a side of an insertion slot 535 to a side of the rear surface in the top surface of the magazine cell 53. The fixing notch 532 is a projection for fixing the medium 6 in the magazine cell 53, and projects toward the inside of the magazine cell 53. When the medium 6 is inserted into the magazine cell 53, the fixing notch 532 goes into and is engaged with the groove formed on the medium 6, and fixes the medium 6 in the magazine cell 53. For example, it is desirable that the fixing notch 532 has a certain degree of elasticity so that the insertion and pull of the medium 6 into the magazine cell 53 may not be prevented. Here, a groove engaged with the fixing notch 532 is formed on the medium 6 generally.

In the rear surface of each magazine cell 53, each magazine cell 53 is hinge-connected to another adjoining magazine cell 53 via the connecting shaft 54. In the rear surface of each magazine cell 53, a shaft hole extended along the flexural axis direction is formed on the first hinge tube 547 arranged along the flexural axis direction. In the rear surface of each magazine cell 53, the second hinge tube 548 along the flexural axis direction is formed on a position shifted from the first hinge tube 547 in the continuation direction. Then, a shaft hole extended along the flexural axis direction is formed on the second hinge tube 548. The first hinge tube 547 and the second hinge tube 548 are formed at the positions shifted also in the flexural axis direction. That is, in a state where the magazine cells 53 are arranged and adjoined in the continuation direction, the first hinge tube 547 of the magazine cell 53 does not interfere in the second hinge tube 548 of another adjoining magazine cell 53, as illustrated in FIG. 3. Moreover, in the state where the magazine cells 53 are arranged and adjoined in the continuation direction, the shaft hole which the first hinge tube 547 of the magazine cell 53 has is communicated with the shaft hole which the second hinge tube 548 of another adjoining magazine cell 53 has. In the present embodiment, two second hinge tubes 548 are arranged at the positions which sandwich the first hinge tube 547 in the flexural axis direction.

Then, the two magazine cells 53 to be connected are arranged in the continuation direction. The shaft hole which the first hinge tube 547 of the magazine cell 53 has and the shaft hole which the second hinge tube 548 of another adjoining magazine cell 53 has are penetrated by the connecting shaft 54 in the state where the shaft holes are communicated with each other. Thereby, adjoining magazine cells 53 are rotatably hinge-connected by the connecting shaft 54. A column-shaped stopper is formed on one end of the connecting shaft 54. Another column-shaped stopper is screwed in and fixed to another end opposite to the one end on which the stopper of the connecting shaft 54 is formed. That is, the connecting shaft 54, the first hinge tube 547 and the second hinge tube 548 are included in the hinge member. Then, in the magazine 5, the user hinge-connects arbitrary numbers of magazine cells 53 by using the connecting shafts 54, so that the magazine 5 can be configured so as to be able to store the media 6 of the desired number.

Referring to FIG. 3, the rack gears 56 in which teeth are cut along the flexural axis direction is formed on the rear surface of the magazine cell 53, i.e., the rear surfaces of the first hinge tube 547 and the second hinge tube 548. The pitch is aligned so that the rack gears 56 engage with gears 11a1 and 11a2 of a first driver 11a and gears 11b1 and 11b2 of a second driver 11b which the driving device 11 of the cartridge auto-loader 100 mentioned later includes. The pitch of the rack gears 56 of each magazine cell 53 is aligned when the respective magazine cells 53 hinge-connected by the connecting shaft 54 are linearly connected and are parallel to each other, as illustrated in FIG. 3. In the following description, the state where the hinge-connected magazine cells 53 are linearly connected and are parallel to each other, as illustrated in FIG. 3, is referred to as a state where magazine cells 53 are closed or the magazine 5 is closed.

Referring to FIG. 3, the magazine cell 53 includes rotary gears 57. The rotary gears 57 are provided in the sides of the top surface and the bottom surface. The pitch is aligned so that the rotary gears 57 engage with gears 11c1 and 11c2 of a third driver 11c which the driving device 11 of the cartridge auto-loader 100 mentioned later includes. The rotary gears 57 which the magazine cell 53 which has come to a circular arc portion of the conveyance route 30 of the magazine 5 has engage with the gears 11c1 and 11c2 of the third driver 11c.

In addition, referring to FIG. 3, the magazine cell 53 includes the incorrect introduction prevention key 58 between the rack gears 56. The incorrect introduction prevention key 58 has a shape which can pass through key grooves 71a and 72a provided in the openings of the first introduction ejector 71 and the second introduction ejector 72 mentioned later, respectively. The incorrect introduction prevention key 58 is offset from a central line of the magazine 5, i.e., is arranged close to one rack gear 56 among the rack gears 56 arranged up and down. Thereby, the incorrect introduction can be prevented. Thus, the incorrect introduction prevention key 58 forms an incorrect introduction prevention device along with the key grooves 71a and 72a. The cartridge auto-loader 100 can pass the magazine 5 as mention later, and can introduce the magazine 5 from both of the first introduction ejector 71 and the second introduction ejector 72. It is, therefore, considered that the user introduces the magazine 5 from an incorrect direction. However, since the incorrect introduction prevention key 58 and the key grooves 71a and 72a are provided, the incorrect introduction of the magazine 5 can be prevented.

In addition, referring to FIGS. 5 and 6, a lateral slip prevention convex portion 536 is extended on an edge of a top surface side in one side surface of the magazine cell 53. Similarly, a lateral slip prevention convex portion is also extended on an edge of a bottom surface side. On the contrary, a lateral slip prevention concave portion 537 is extended on an edge of a top surface side in another side surface of the magazine cell 53. Similarly, a lateral slip prevention concave portion is also extended on an edge of a bottom surface side. The lateral slip prevention convex portion 536 of the magazine cell 53 and the lateral slip prevention concave portion 537 of another adjoining magazine cell 53 engage with each other in a state where the respective magazine cells 53 rotatably hinge-connected as mentioned above are closed. Thereby, the slip of the magazine cells 53 in the flexural axis direction in the state where the magazine cells 53 are closed can be prevented.

In addition, referring to FIG. 3, a connecting boss 534 and the connecting hook 55 are provided on an end of a front surface side in the top surface of the magazine cell 53. The connecting boss 534 is a cylindrical projection and is perpendicularly projected from the top surface in the front surface side of the magazine cell 53. The connecting hook 55 is rotatably fitted in a shaft 551 perpendicularly provided on the top surface of the magazine cell 53. FIGS. 5 and 6 are partial perspective views illustrating the constitution of the connecting hook 55 of the magazine 5 as the example of the embodiment. FIG. 5 illustrates the closed state of the connecting hook 55, and FIG. 6 illustrates the opened state of the connecting hook 55. In addition, FIGS. 5 and 6 illustrate a state where a portion of the magazine cell 53 is cut in the middle of the magazine cell 53 in the flexural axis direction.

The connecting hook 55 includes a circular concave portion 553 which can partially surround an outer circumference of the connecting boss 534, as illustrated in FIGS. 5 and 6. The connecting hook 55 stores the connecting boss 534 of the adjoining magazine cell 53 into the concave portion 553 and engages with the connecting boss 534. In the following state, the state where the connecting hook 55 stores the connecting boss 534 of the adjoining magazine cell 53 into the concave portion 553 and engages with the connecting boss 534 may be referred to as a locked state. A connecting hook spring 556 which biases the connecting hook 55 so as to rotate the connecting hook 55 to the front surface side is provided on the top surface of the magazine cell 53. In the top surface of the magazine cell 53, a stopper 558 projects at a position of the front surface side in front of the connecting hook 55. The connecting hook 55 which is biased to the front surface side by the connecting hook spring 556 comes in contact with the stopper 558, and hence the further rotation to the front surface side is prevented. In the following description, a state where the connecting hook 55 rotates to the front surface side and contacts the stopper 558 may be referred to as a closed state, as illustrated in FIG. 5. The locked state mentioned above is realized by this closed state. That is, the connecting hook 55 is always pushed to the front surface side by the connecting hook spring 556, and is pushed to the stopper 558 projected from the magazine cell 53. Thereby, the connecting hook 55 is biased by the connecting hook spring 556 so as to maintain the closed state illustrated in FIG. 5.

In the closed state illustrated in FIG. 5, the connecting hook 55 includes a projection 552 that projects to the front surface side of the magazine cell 53. For example, in the closed state of the connecting hook 55, the projection 552 projects to the front surface side of the magazine cell 53 by the almost same length as the diameter of the connecting boss 534. Here, it is desirable that the projection 552 has a smooth circular arc shape. Then, when the projection 552 is pushed to the rear surface side, the connecting hook 55 rotates about the shaft 551 toward the rear surface side as illustrated in FIG. 6, and a space where the connecting boss 534 can escape from the inside of the concave portion 553 is formed.

In the state where the projection 552 is pushed, the connecting hook 55 rotates toward the rear surface side and the space where only the connecting boss 534 can pass is formed, the projection 552 contacts the above-mentioned stopper 558, as illustrated in FIG. 6. The further rotation of the connecting hook 55 to the rear surface side is prevented. In the following description, the state where the connecting hook 55 rotates toward the rear surface side and the space where only the connecting boss 534 can pass is formed may be referred to as an opened state, as illustrated in FIG. 6. An unlocked state is realized by this opened state.

Figure 11:
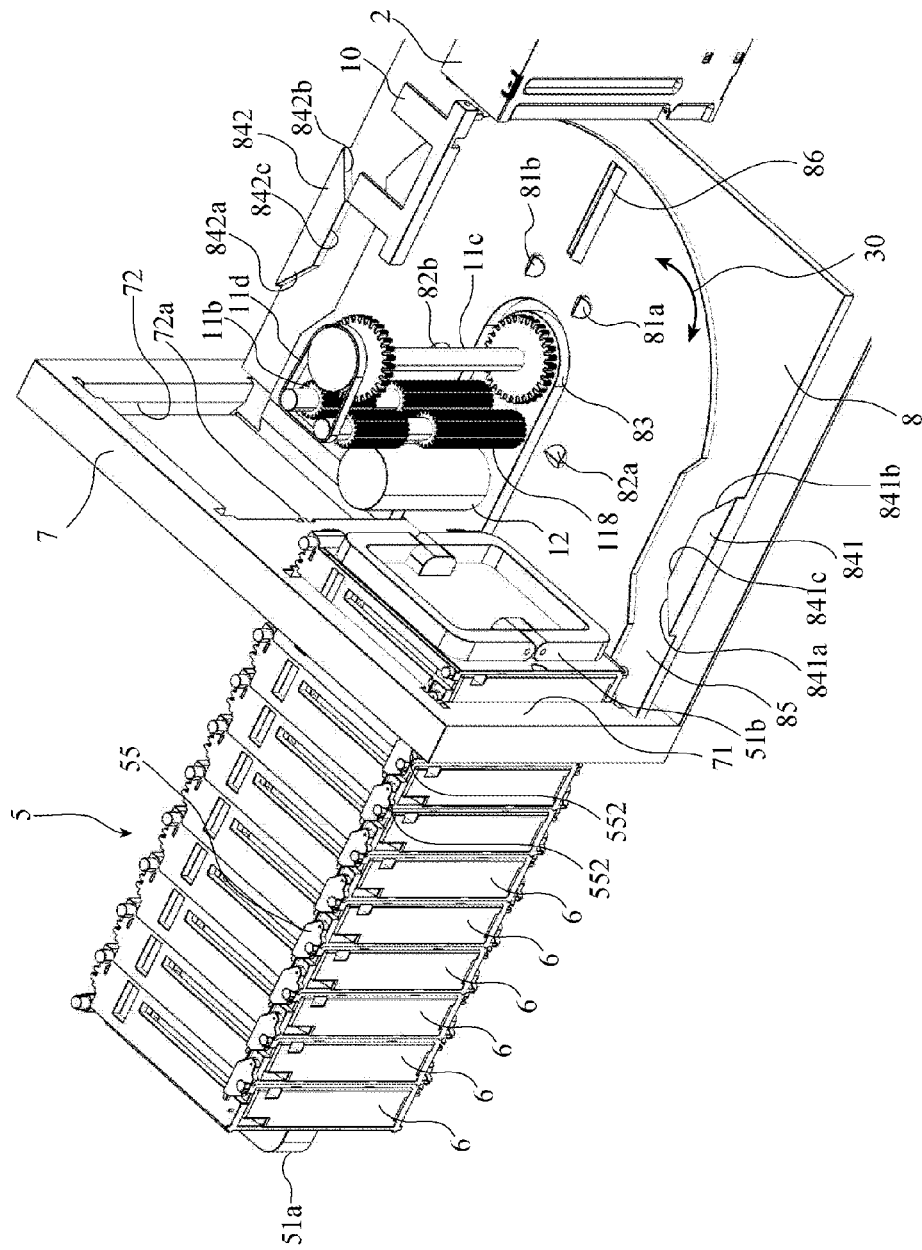
FIG. 11 is a partial perspective view illustrating a state where the magazine is introduced into the cartridge auto-loader as the example of the embodiment.

When the projection 552 is pushed to the rear surface side, the connecting hook 55 which is in the locked state illustrated in FIG. 5 becomes the opened state illustrated in FIG. 11. In addition, the connecting hook 55 and the connecting boss 534 are also formed on an end of the insertion slot side in the bottom surface of the magazine cell 53. Although FIGS. 5 and 6 illustrate the connecting hook 55 formed on the top surface of the magazine cell 53, the connecting hook 55 and the connecting boss 534 formed on the bottom surface of the magazine cell 53 have the same composition as those formed on the top surface of the magazine cell 53. The connecting hooks 55 formed on the top and the bottom surfaces of the magazine cell 53 engage with the connecting bosses 534 of another adjoining magazine cell 53, respectively.

As described later, in the cartridge auto-loader 100, each of a connecting hook release block 841 of the lower guide 8 and a connecting hook release block of the upper guide 9 corresponding to the former pushes the projection 552 of the connecting hook 55 on the magazine cell 53 being conveyed, to the rear surface side and releases the locked state.

According to the above-mentioned composition, in the magazine 5, each of the magazine cells 53 having the same composition is rotatably hinge-connected to the adjoining magazine cell 53 via the connecting shaft 54 in each rear surface. That is, the magazine cells 53 are serially connected by hinge connection. In the state where the magazine cells 53 are closed, such a hinge-connected magazine cell 53 engages with and is connected to the connecting bosses 534 of the adjoining magazine cell 53 by the connecting hooks 55 at the front surface side. Thereby, the magazine 5 holds the magazine cells 53 in the closed state, which facilitates handling of carrying.

[Magnetic Tape Device] Referring to FIGS. 1 and 2, the magnetic tape device 1 includes the cartridge auto-loader 100, the tape drive 2, a controller 3, and a power supply unit 4. The magnetic tape device 1 is a rack-mounted type, and the size for each direction of length, width, and height is set according to a predetermined standard.

The tape drive 2 corresponds to an information processor which performs at least one of record processing and read processing of information to a recording medium, i.e., the medium 6, as mentioned above. The tape drive 2 can insert the medium 6 from an insertion slot 21 illustrated in FIG. 2, and stores the medium 6 therein. The tape drive 2 performs data access to the medium 6 inserted by the feeder mechanism 10 corresponding to a medium moving unit. The tape drive 2 includes a magnetic head. Then, the magnetic head performs reading and writing of data to the magnetic tape pulled out from the reel of the medium 6. Here, well-known various devices can be used as the tape drive 2 which is an information processing device, and the detailed explanation thereof is omitted.

The controller 3 controls each element of the magnetic tape device 1. The controller 3 controls the conveyance and the positioning of the magazine 5 in the cartridge auto-loader 100 mentioned later, for example. For this reason, the controller 3 is electrically connected to a detecting device provided on the conveyance route 30. Specifically, the controller 3 is electrically connected to a first magazine ejection sensor 81a, a second magazine ejection sensor 81b, a first magazine introduction sensor 82a, and a second magazine introduction sensor 82b. In the cartridge auto-loader 100, the controller 3 also performs movement control of the medium 6 between the tape drive 2 and the magazine 5 by using the feeder mechanism 10. In addition, the controller 3 performs access control to the medium 6 by the tape drive 2.

The power supply unit 4 is an electric supply means for supplying an electric power to each element of the magnetic tape device 1, and receives current supply from an AC power supply, for example. Here, the electric supply means is not limited to the external AC power supply, for example, and may be equipped with a battery for electric supply.

Referring to FIG. 1, the cartridge auto-loader 100 includes the housing 103. The magazine 5 storing the media 6 is introduced in the housing 103. Then, the cartridge auto-loader 100 supplies the medium 6 to be accessed among the media 6 stored into the magazine 5 to the tape drive 2.

Referring to FIGS. 1 and 2, the cartridge auto-loader 100 includes, in the housing 103, the conveyance route 30 on which the magazine 5 is conveyed, the driving device 11, and the feeder mechanism 10 which supplies the medium 6 stored into the magazine cell 53 to the tape drive 2. In the cartridge auto-loader 100, a mechanism for conveying the magazine 5 includes the lower guide 8, the upper guide 9, the driving device 11 and a magazine feeding motor 12. The lower guide 8 and the upper guide 9 are arranged in opposition to each other, so that they form the conveyance route 30 in the housing 103.

The housing 103 is configured as a case equipped with the lower guide 8, the upper guide 9, and a front cover 7 as respective surfaces. The lower guide 8 and the upper guide 9 are rectangular tabular members, respectively, and are arranged in parallel so as to be opposed to each other. Moreover, the front cover 7 is arranged as a surface which connects the upper guide 9 and the lower guide 8.

The front cover 7 is arranged at the front of the magnetic tape device 1. In the housing 103, the conveyance route 30 is formed. The first introduction ejector 71 is provided on one end of the conveyance route 30, and the second introduction ejector 72 is provided on another end of the conveyance route 30. An opening of the first introduction ejector 71 and an opening of the second introduction ejector 72 are provided on the front cover 7 in parallel. The opening of the first introduction ejector 71 and the opening of the second introduction ejector 72 are rectangles. Each of the rectangular openings has a size larger than an outline of the side surface of the magazine cell 53 in the magazine 5 by a clearance.

Referring to FIG. 2, the key grooves 71a and 72a for forming the incorrect introduction prevention device as described above are provided on the openings of the first introduction ejector 71 and the second introduction ejector 72, respectively.

Referring to FIGS. 2 and 11, in the lower guide 8, the connecting shaft guide groove 83 and the connecting hook guide groove 85 are formed on a surface located at the inside of the housing 103, i.e., a surface opposed to the upper guide 9. The grooves corresponding to the connecting shaft guide groove 83 and the connecting hook guide groove 85 are formed on a surface of the upper guide 9 opposed to the lower guide 8, and form the conveyance route 30 along with the connecting shaft guide groove 83 and the connecting hook guide groove 85. That is, in the housing 103, the connecting shaft guide groove of the upper guide 9 is plane-symmetrically formed with respect to the connecting shaft guide groove 83 of the lower guide 8. Also, the connecting hook guide groove of the upper guide 9 is plane-symmetrically formed with respect to the connecting hook guide groove 85 of the lower guide 8.

The connecting shaft guide groove 83 is a groove through which the connecting shaft 54 of the magazine cell 53 as described later passes, and the connecting hook guide groove 85 is a groove through which the connecting hook 55 of the magazine cell 53 as described later passes. That is, in the cartridge auto-loader 100, when the magazine 5 is conveyed, the connecting shaft 54 which projects from the bottom surface of the magazine cell 53 is guided in the connecting shaft guide groove 83 of the lower guide 8. In addition, the connecting hook 55 provided on the bottom surface of the magazine cell 53 is guided in the connecting hook guide groove 85 of the lower guide 8. Similarly, in the cartridge auto-loader 100, when the magazine 5 is conveyed, the connecting shaft 54 which projects from the top surface of the magazine cell 53 is guided in the connecting shaft guide groove of the upper guide 9. In addition, the connecting hook 55 provided on the top surface of the magazine cell 53 is guided in the connecting hook guide groove of the upper guide 9.

In the housing 103, the connecting shaft guide groove 83 and the connecting hook guide groove 85 once convey linearly the magazine 5 introduced from any one of the first introduction ejector 71 and the second introduction ejector 72. And then, the connecting shaft guide groove 83 and the connecting hook guide groove 85 rotate the magazine 5 180 degrees (i.e., reverses the magazine 5), and guide the magazine 5 to another introduction ejector different from the introduction ejector used for the introduction. Then, the connecting shaft guide groove 83 and the connecting hook guide groove 85 project the magazine cells 53 sequentially from a forehand magazine cell 53 of the magazine 5, from the housing 103. That is, the conveyance route 30 which is formed with the connecting shaft guide groove 83 and the connecting hook guide groove 85 and guides the magazine 5 has a curved shape. More specifically, the conveyance route 30 has a shape in which two straight line portions are connected to a circular arc portion. The circular arc portion is located in a portion reversing the magazine 5.

That is, in the cartridge auto-loader 100, the magazine 5 is linearly introduced from any one of the first introduction ejector 71 and the second introduction ejector 72, is reversed at the circular arc portion, and then is linearly conveyed again. The magazine 5 can be ejected from another introduction ejector different from the introduction ejector used for the introduction. The user can pull out the ejected magazine 5. Thereby, the magazine 5 can be ejected without reversal when the magazine 5 is ejected, and hence the ejection time of the magazine 5 can be shortened.

Figure 13:
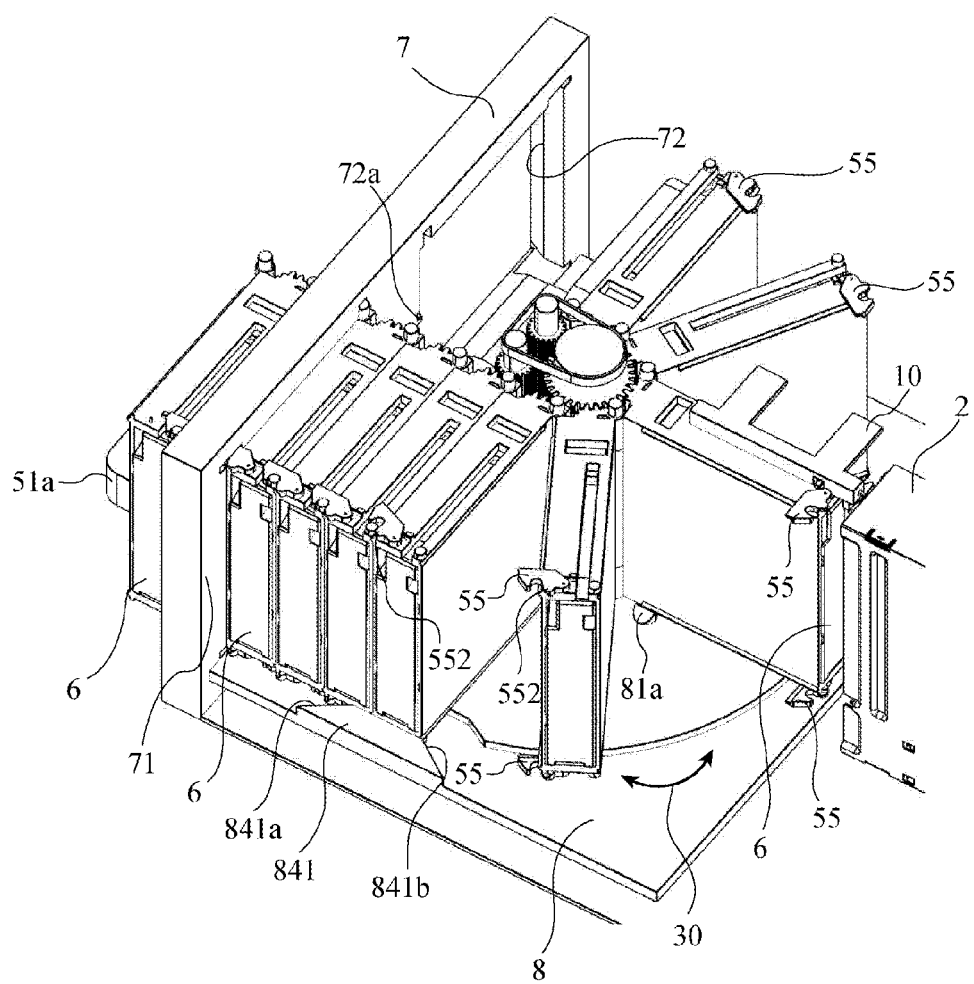
FIG. 13 is a partial perspective view illustrating a state where the magazine is introduced into the cartridge auto-loader as the example of the embodiment.

In the circular arc portion of the conveyance route 30, the engagement with the connecting boss 534 of the adjoining magazine cell 53 is released, and each connecting hook 55 located at the front surface side (i.e., an outer circumference side of the circular arc portion) becomes an unlocked state. Thereby, in the circular arc portion of the conveyance route 30, an end of the front surface side of the magazine cell 53 is separated from another adjoining magazine cell 53, and the magazine cells spread radially, as illustrated in FIG. 13.

In the housing 103, the driving device 11 and the magazine feeding motor 12 are arranged in an area surrounded by the connecting shaft guide groove 83 formed in the shape of the circular arc. The magazine feeding motor 12 is a motor which rotationally drives the driving device 11, and is controlled by the controller 3.

Figure 8:
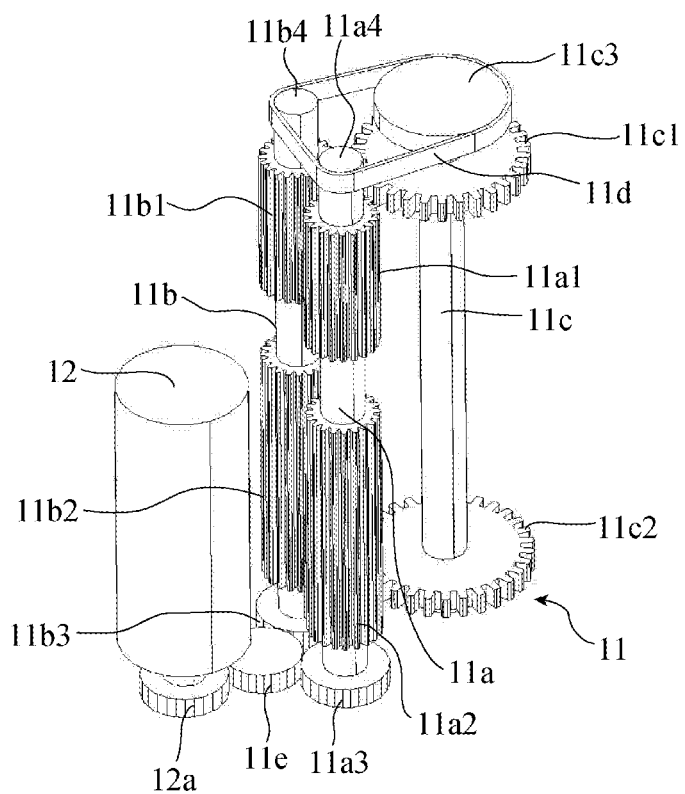
FIG. 8 is a perspective view illustrating a driving device which the cartridge auto-loader includes as the example of the embodiment.
Figure 9:
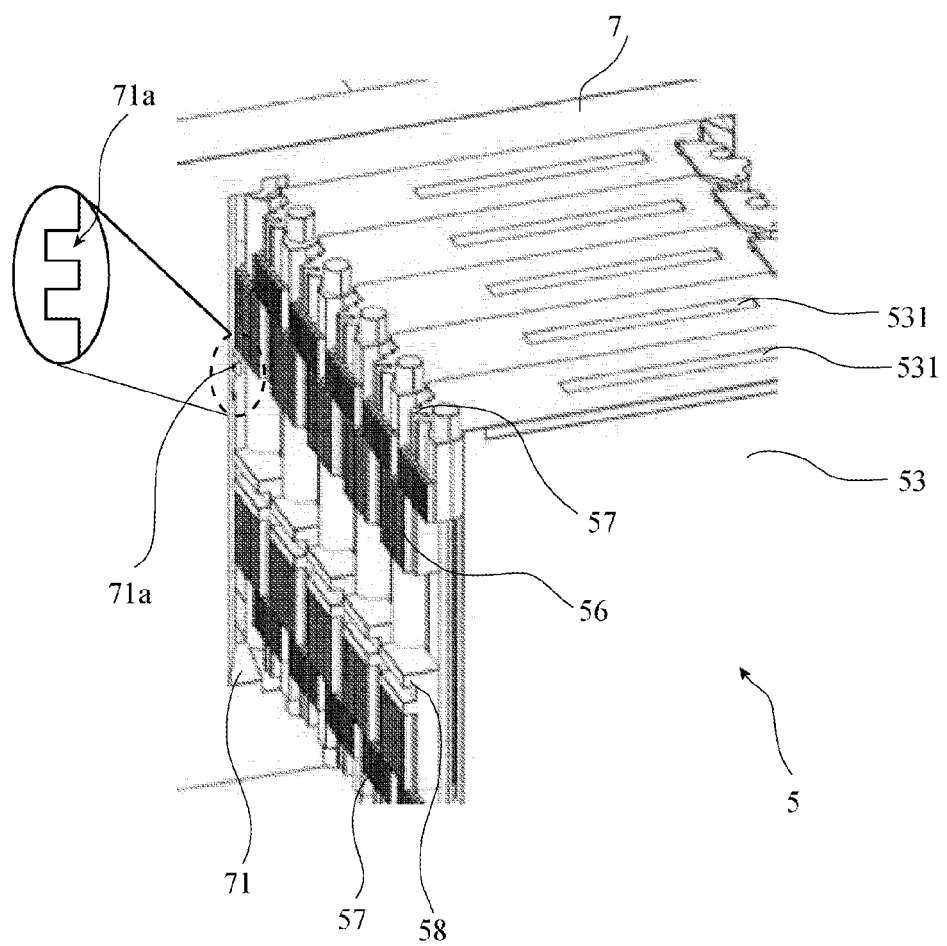
FIG. 9 is an explanatory diagram illustrating a state where the magazine is incorrectly introduced into a first introduction ejector.

Referring to FIG. 8, the driving device 11 includes the first driver 11a, the second driver 11b, and the third driver 11c. The first driver 11a receives the magazine 5 introduced from the first introduction ejector 71 along the conveyance route 30. The second driver 11b sends the magazine 5 introduced from the first introduction ejector 71, to a position where the magazine 5 can be ejected from the second introduction ejector 72, along the conveyance route 30. The third driver 11c drives the magazine 5 in a section located between a section where the first driver 11a drives the magazine 5 and a section where the second driver 11b drives the magazine 5.

The first driver 11a includes the first gear 11a1 and the second gear 11a2 on a shaft member. The first gear 11a1 engages with the rack gear 56 which the magazine 5 has near the top surface. The second gear 11a2 engages with the rack gear 56 which the magazine 5 has near the bottom surface. A gap is formed between the first gear 11a1 and the second gear 11a2. This is because the incorrect introduction prevention key 58 is passed between the first gear 11a1 and the second gear 11a2. The first driver 11a includes a third gear 11a3 on a lower end thereof. The third gear 11a3 transmits the rotation of a drive gear 12a with which the magazine feeding motor 12 is equipped, to the first driver 11a via a transmission gear 11e. The first driver 11a includes a transmission pulley 11a4 on an upper end thereof. The transmission pulley 11a4 transmits a driving force to the third driver 11c via a driving belt 11d. A rotary shaft of the first driver 11a is perpendicularly provided between the lower guide 8 and the upper guide 9, and is arranged at a position on the conveyance route 30 in which the magazine cell 53 in the closed state is conveyed. That is, the first driver 11a is arranged adjacent to a position where the connecting shaft guide groove 83 and the connecting hook guide groove 85 become straight lines. Thereby, the first driver 11a can engage with the rack gears 56 formed on the rear surface of the magazine cell 53.

The second driver 11b includes the first gear 11b1 and the second gear 11b2 on a shaft member. The first gear 11b1 engages with the rack gear 56 which the magazine 5 has near the top surface. The second gear 11b2 engages with the rack gear 56 which the magazine 5 has near the bottom surface. A gap is formed between the first gear 11b1 and the second gear 11b2. This is because the incorrect introduction prevention key 58 is passed between the first gear 11b1 and the second gear 11b2. The second driver 11b includes a third gear 11b3 on a lower end thereof. The third gear 11b3 transmits the rotation of the drive gear 12a with which the magazine feeding motor 12 is equipped, to the second driver 11b via the transmission gear 11e. The second driver 11b includes a transmission pulley 11b4 on an upper end thereof. The transmission pulley 11b4 transmits a driving force to the third driver 11c via the driving belt 11d. A rotary shaft of the second driver 11b is perpendicularly provided between the lower guide 8 and the upper guide 9, and is arranged at the position on the conveyance route 30 in which the magazine cell 53 in the closed state is conveyed. That is, the second driver 11b is arranged adjacent to a position where the connecting shaft guide groove 83 and the connecting hook guide groove 85 become straight lines. Thereby, the second driver 11b can engage with the rack gears 56 formed on the rear surface of the magazine cell 53.

The third driver 11c includes the first gear 11c1 and the second gear 11c2 on a shaft member. The first gear 11c1 engages with the rotary gear 57 which the magazine 5 has near the top surface. The second gear 11c2 engages with the rotary gear 57 which the magazine 5 has near the bottom surface. The third driver 11c includes a transmission pulley 11c3 on an upper end thereof. The transmission pulley 11c3 receives the driving force from the first driver 11a and the second driver 11b via the driving belt 11d. A rotary shaft of the third driver 11c is perpendicularly provided between the lower guide 8 and the upper guide 9, and is arranged at the position on the conveyance route 30 in which the magazine cell 53 in the opened state is conveyed. That is, the third driver 11c is arranged adjacent to a position where the connecting shaft guide groove 83 and the connecting hook guide groove 85 become circular arcs. Thereby, the third driver 11c can engage with the rotary gears 57 formed on the rear surface of the magazine cell 53.

The magazine 5 is conveyed while being bent. In the bent portion of the magazine 5, the first gear 11c1 and the second gear 11c2 of the third driver 11c engage with the rotary gears 57 of the magazine cell 53, and then the magazine 5 is conveyed by both of the first driver 11a and the third driver 11c. In the present embodiment, when the first gear 11c1 and the second gear 11c2 of the third driver 11c advance by ten teeth, the magazine cell 53 advances by one volume. While the magazine cell 53 advances by one volume, third driver 11c is configured to rotate 60 degrees, i.e., ⅙ turns. The magazine cell 53 is positioned by the positioning block 86 at the front of the tape drive 2, and the feeder mechanism 10 takes the medium 6 in and out of the tape drive 2. The medium 6 in which processing is finished is returned to the original magazine cell 53, and then the third driver 11c rotates by one volume and the magazine 5 is conveyed. This is repeated sequentially and the medium 6 is processed by the tape drive 2 in order. When the magazine 5 is further conveyed, the first gear 11b1 and the second gear 11b2 of the second driver 11b engage with the rack gears 56 of the magazine cell 53. Then, three drivers of the first driver 11a, the second driver 11b, and the third driver 11c drive the magazine 5.

The magazine feeding motor 12 can perform normal rotation or reversing rotation. A direction of movement of the magazine 5 is decided by a rotary direction of the magazine feeding motor 12.

The magnetic tape device 1 can move the magazine in one direction and perform the process from the introduction to the ejection of the magazine 5 by being equipped with the driving device 11. Thereby, the ejection time of the magazine 5 can be shortened. Here, the magazine 5 may be reversed and ejected when reversing the magazine 5 shortens the ejection time according to an introduction state of the magazine 5, i.e., according to the number of magazine cells 53 which is advancing.

In the magnetic tape device 1, the tape drive 2 is arranged, in opposition to the conveyance route 30, at a reversing position formed on the circular arc portion of the above-mentioned conveyance route 30. At a position on the lower guide 8 opposed to an insertion slot 21 of the tape drive 2, the positioning block 86 is projected along an inserting-and-pulling direction of the medium 6 to the insertion slot 21. The positioning block 86 is fitted to the positioning groove 531 formed on the bottom surface of the magazine cell 53. Thereby, the positioning block 86 fixes the magazine cell 53 at a position where the insertion slot of the magazine cell 53 is opposed to the insertion slot 21 for the medium 6 of the tape drive 2, in parallel to the inserting-and-pulling direction of the medium 6. In the following description, the position where the insertion slot of the magazine cell 53 is opposed to the insertion slot 21 of the tape drive 2 on the circular arc portion of the conveyance route 30 may be referred to as a feed position.

The tape drive 2 faces the circular arc portion of the conveyance route 30 of the magazine 5, and is provided at the most distant position from the front cover 7. The tape drive 2 is arranged in a state where the insertion slot 21 is turned to a side of the front cover 7.

The first magazine ejection sensor 81a and the second magazine ejection sensor 81b are arranged between the positioning block 86 and the connecting shaft guide groove 83 on an area through which the magazine cell 53 on the lower guide 8 passes. The first magazine ejection sensor 81a is arranged near the first introduction ejector 71, and the second magazine ejection sensor 81b is arranged near the second introduction ejector 72. In addition, the first magazine introduction sensor 82a is arranged at a position, near the connecting hook release block 841 described later, on the area through which the magazine cell 53 on the lower guide 8 passes. The second magazine introduction sensor 82b is arranged at a position, near the connecting hook release block 842 described later, on the area through which the magazine cell 53 on the lower guide 8 passes. The first magazine ejection sensor 81a, the second magazine ejection sensor 81b, the first magazine introduction sensor 82a, and the second magazine introduction sensor 82b are included in a detection device that determines a conveyance state of the magazine 5 on the conveyance route 30. A pair of the first magazine ejection sensor 81a and the first magazine introduction sensor 82a constitutes a first sensor arranged near the first introduction ejector 71. A pair of the second magazine ejection sensor 81b and the second magazine introduction sensor 82b constitutes a second sensor arranged near the second introduction ejector 72. Thus, a reason for having the first sensor and the second sensor is to deal with the case where the magazine 5 is introduced from the first introduction ejector 71, and the case where the magazine 5 is introduced from the second introduction ejector 72.

Each of the first magazine ejection sensor 81a, the second magazine ejection sensor 81b, the first magazine introduction sensor 82a, and the second magazine introduction sensor 82b is a push switch. The sensor is pushed by the bottom of the magazine cell 53 in the state where the magazine cell 53 has passed through an upper part of the sensor, so that the sensor is turned on for example. The conveyance state of the magazine on the conveyance route 30 can be determined by a signal of each sensor. Each of the first magazine ejection sensor 81a, the second magazine ejection sensor 81b, the first magazine introduction sensor 82a, and the second magazine introduction sensor 82b is not limited to the push switch. For example, other switches of an optical detection type or the like may be used as these sensors, and these sensors may be changed variously.

The magnetic tape device 1 is equipped with the connecting hook release blocks 841 and 842 in the connecting hook guide groove 85 of the lower guide 8. The connecting hook release block 841 is provided near the first introduction ejector 71, and the connecting hook release block 842 is provided near the second introduction ejector 72. The connecting hook release blocks 841 and 842 contact the projection 552 of the connecting hook 55 on the magazine cell 53 which moves inside the connecting hook guide groove 85, and open the connecting hook 55. The connecting hook release blocks 841 and 842 contact the projection 552 of the connecting hook 55 on the magazine cell 53 which moves inside the connecting hook guide groove 85 in one direction, and release the engagement of the connecting hook 55 and the connecting boss 534. The connecting hook release blocks 841 and 842 contact the projection 552 of the connecting hook 55 on the magazine cell 53 which moves in a direction opposed to the one direction, and engage the connecting hook 55 with the connecting boss 534.

In the conveyance route 30 of the magazine 5 formed with the connecting shaft guide groove 83 and the connecting hook guide groove 85, the connecting hook release block 841 is provided along a linear route which makes the first introduction ejector 71a starting point. More specifically, the connecting hook release block 841 is arranged near a border between the linear route and the circular arc portion. The connecting hook release block 841 is arranged at a position which faces the front surface of the magazine cell 53 in the connecting hook guide groove 85. In the following description concerning the connecting hook release block 841, it is assumed that a direction in which the magazine 5 advances when the magazine 5 is introduced from the first introduction ejector 71 is a sending direction, and an opposite direction thereof is a return direction.

The connecting hook release block 841 contacts the projection 552 of the connecting hook 55 on the magazine cell 53 which moves inside the connecting hook guide groove 85 in the sending direction, and releases the engagement of the connecting hook 55 and the connecting boss 534. The connecting hook release block 841 contacts the projection 552 of the connecting hook 55 on the magazine cell 53 which moves inside the connecting hook guide groove 85 in the return direction, and engages the connecting hook 55 with the connecting boss 534.

The connecting hook release block 841 is stood as a block having a trapezoidal shape in the connecting hook guide groove 85, and includes inclined planes 841a and 841b and a flat plane 841c along the route.

The inclined plane 841a is protruded toward the connecting shaft guide groove 83 according to a direction advancing toward the second introduction ejector 72 from the first introduction ejector 71. The inclined plane 841a is introduced from the first introduction ejector 71, pushes, to the rear surface side, the projection 552 of the connecting hook 55 mounted on the bottom surface of the magazine cell 53 which is conveyed in a direction (i.e., the sending direction) away from the first introduction ejector 71, and opens the connecting hook 55. Thereby, the engagement of the connecting hook 55 and the connecting boss 534 is released (or unlocked). Then, the inclined plane 841a guides the magazine cell 53, which is conveyed in the direction away from the first introduction ejector 71, to the flat plane 841c in a state where the connecting hook 55 is opened.

The inclined plane 841b keeps away from the connecting shaft guide groove 83 according to the direction advancing toward the second introduction ejector 72 from the first introduction ejector 71. The inclined plane 841b pushes, to the rear surface side, the projection 552 of the connecting hook 55 mounted on the bottom surface of the magazine cell 53 which is conveyed in a direction (i.e., the return direction) that returns to the first introduction ejector 71, and opens the connecting hook 55. Then, the inclined plane 841b guides the magazine cell 53, which is conveyed in the direction that returns to the first introduction ejector 71, to the flat plane 841c in a state where the connecting hook 55 is opened.

The flat plane 841c is connected to the inclined planes 841a and 841b, and is in parallel with the connecting shaft guide groove 83. The magazine cell 53 which is conveyed in the sending direction or the return direction is guided by the flat plane 841c in a state where the connecting hook 55 is opened. That is, the flat plane 841c guides the magazine cell 53 to be conveyed in the sending direction or the return direction in a state where the flat plane 841c pushes the projection 552 of the connecting hook 55 mounted on the bottom surface of the magazine cell 53 to the side of the rear surface.

An end of the flat plane 841c in the sending direction is located near the tape drive 2, compared to a center of the circular arc of a reversing portion of the conveyance route 30. Thereby, when the magazine 5 is conveyed in the sending direction, each magazine cell 53 goes into the circular arc portion of the conveyance route 30 by the flat plane 841c in a state where the connecting hook 55 is opened. Then, in the circular arc portion, the separation between the ends of the front surface side of the magazine cell 53 and the adjoining magazine cell 53 is begun.

On the other hand, when the magazine 5 is conveyed in the return direction, an end of the front surface side of each magazine cell 53 guided in the state where the connecting hook 55 is opened by the inclined plane 841b comes close to an end of the front surface side of another adjoining magazine cell 53 at the end of the flat plane 841c in the sending direction, and the magazine 5 becomes the closed state. In the magazine cell 53 which is conveyed in the return direction after passing through the flat plane 841c, the connecting hook 55 is pushed to the front surface side by the connecting hook spring 556 and the magazine 5 becomes the closed state. At this time, since each magazine cell 53 becomes the closed state, the connecting hook 55 engages with the connecting boss 534 of another adjoining magazine cell 53 to become the locked state.

In the conveyance route 30 of the magazine 5 formed with the connecting shaft guide groove 83 and the connecting hook guide groove 85, the connecting hook release block 842 is provided along a linear route which makes the second introduction ejector 72 a starting point. More specifically, the connecting hook release block 842 is arranged near a border between the linear route and the circular arc portion. The connecting hook release block 842 is arranged at a position which faces the front surface of the magazine cell 53 in the connecting hook guide groove 85. In the following description concerning the connecting hook release block 842, it is assumed that a direction in which the magazine 5 advances when the magazine 5 is introduced from the second introduction ejector 72 is the sending direction, and an opposite direction thereof is the return direction.

The connecting hook release block 842 contacts the projection 552 of the connecting hook 55 on the magazine cell 53 which moves inside the connecting hook guide groove 85 in the sending direction, and releases the engagement of the connecting hook 55 and the connecting boss 534 of the adjoining magazine cell 53. The connecting hook release block 842 contacts the projection 552 of the connecting hook 55 on the magazine cell 53 which moves inside the connecting hook guide groove 85 in the return direction, and engages the connecting hook 55 with the connecting boss 534 of the adjoining magazine cell 53.

The connecting hook release block 842 is stood as a block having a trapezoidal shape in the connecting hook guide groove 85, and includes inclined planes 842a and 842b and a flat plane 842c along the route.

The inclined plane 842a is protruded toward the connecting shaft guide groove 83 according to a direction advancing toward the first introduction ejector 71 from the second introduction ejector 72. The inclined plane 842a is introduced from the second introduction ejector 72, pushes, to the rear surface side, the projection 552 of the connecting hook 55 mounted on the bottom surface of the magazine cell 53 which is conveyed in a direction (i.e., the sending direction) away from the second introduction ejector 72, and opens the connecting hook 55. Thereby, the engagement of the connecting hook 55 and the connecting boss 534 is released (or unlocked). Then, the inclined plane 842a guides the magazine cell 53, which is conveyed in the direction away from the second introduction ejector 72, to the flat plane 842c in a state where the connecting hook 55 is opened.

The inclined plane 842b keeps away from the connecting shaft guide groove 83 according to the direction advancing toward the first introduction ejector 71 from the second introduction ejector 72. The inclined plane 842b pushes, to the rear surface side, the projection 552 of the connecting hook 55 mounted on the bottom surface of the magazine cell 53 which is conveyed in a direction (i.e., the return direction) that returns to the second introduction ejector 72, and opens the connecting hook 55. Then, the inclined plane 842b guides the magazine cell 53, which is conveyed in the direction that returns to the second introduction ejector 72, to the flat plane 842c in a state where the connecting hook 55 is opened.

The flat plane 842c is connected to the inclined planes 842a and 842b, and is in parallel with the connecting shaft guide groove 83. The magazine cell 53 which is conveyed in the sending direction or the return direction is guided by the flat plane 842c in a state where the connecting hook 55 is opened. That is, the flat plane 842c guides the magazine cell 53 to be conveyed in the sending direction or the return direction in a state where the flat plane 842c pushes the projection 552 of the connecting hook 55 mounted on the bottom surface of the magazine cell 53 to the side of the rear surface.

An end of the flat plane 842c in the sending direction is located near the tape drive 2, compared to the center of the circular arc of the reversing portion of the conveyance route 30. Thereby, when the magazine 5 is conveyed in the sending direction, each magazine cell 53 goes into the circular arc portion of the conveyance route 30 by the flat plane 842c in a state where the connecting hook 55 is opened. Then, in the circular arc portion, the separation between the ends of the front surface side of the magazine cell 53 and the adjoining magazine cell 53 is begun.

On the other hand, when the magazine is conveyed in the return direction, an end of the front surface side of each magazine cell 53 guided in the state where the connecting hook 55 is opened by the inclined plane 842b comes close to an end of the front surface side of another adjoining magazine cell 53 at the end of the flat plane 842c in the sending direction, and the magazine 5 becomes the closed state. In the magazine cell 53 which is conveyed in the return direction after passing through the flat plane 842c, the connecting hook 55 is pushed to the front surface side by the connecting hook spring 556 and the magazine 5 becomes the closed state. At this time, since each magazine cell 53 becomes the closed state, the connecting hook 55 engages with the connecting boss 534 of another adjoining magazine cell 53 to become the locked state.

As with the connecting hook release blocks 841 and 842 of the lower guide 8, the connecting hook release blocks are formed in the connecting hook guide groove 85 of the upper guide 9. Since the effect of the connection hook release blocks in the upper guide 9 is the same as that of the connection hook release blocks 841 and 842 in the lower guide 8, the detailed explanation thereof is omitted.

The magnetic tape device 1 includes the feeder mechanism 10 at a position of the housing 103 which is above the positioning block 86. The tape drive 2 performs data access to the medium 6 inserted by the feeder mechanism 10 is the medium moving unit that moves the medium 6 between the magazine cell 53 of the conveyed magazine 5 and the tape drive 2. That is, the feeder mechanism 10 inserts the medium 6 stored into the magazine cell 53 into the tape drive 2, or stores the medium 6 ejected from the tape drive 2 into the magazine cell 53. The feeder mechanism 10 engages a hook with the medium 6 via the feeder passing groove 533 formed on the top surface of the magazine cell 53. The feeder mechanism 10 moves the hook along the feeder passing groove 533, so that the medium is moved between the magazine cell 53 and the tape drive 2.

[Operation] The magnetic tape device 1, configured as described above, as an example of the embodiment performs the data access to the medium 6 as follows.

(1) Preparation of Magazine

First, the arbitrary number of magazine cells 53 corresponding to the number of the media 6 to be used are prepared. In each rear surface, the magazine cells 53 are hinge-connected respectively so that the magazine cells 53 may become a train of magazine cells by the connecting shafts 54. Thereby, the magazine 5 which connects the plurality of magazine cells 53 in an integrated fashion is created, as illustrated in FIGS. 3 and 7. A worker stores the medium 6 into the predetermined magazine cell 53 from the insertion slot 535.

Figure 10:
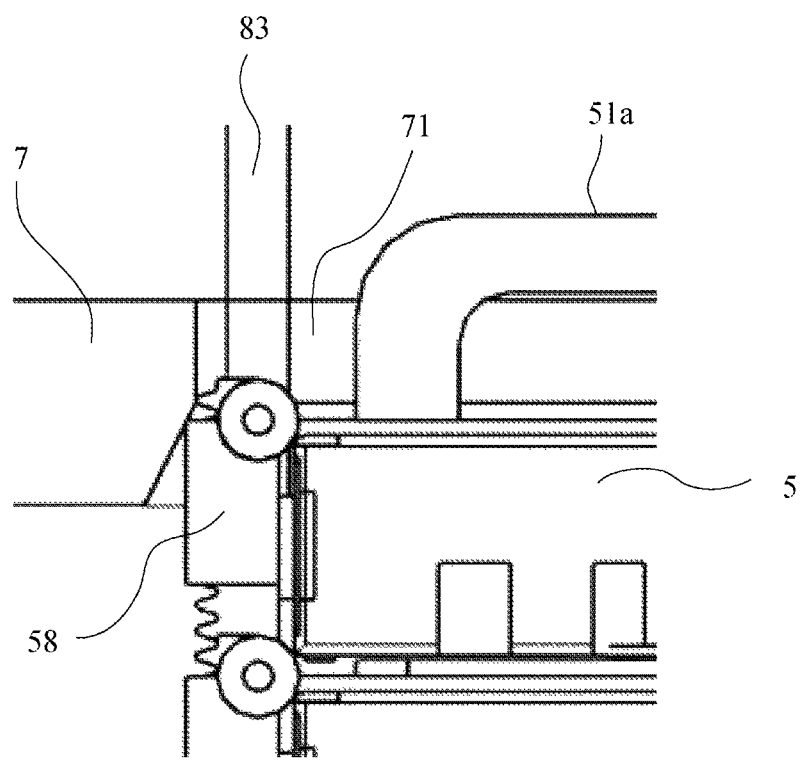
FIG. 10 is an explanatory diagram illustrating a state where the magazine is incorrectly introduced into the first introduction ejector.

The magazine 5 may be introduced into the cartridge auto-loader 100 from either the X1 direction or the X2 direction illustrated in FIG. 7. When the magazine 5 is introduced along the X1 direction, the magazine 5 is introduced from the first introduction ejector 71. On the other hand, when the magazine 5 is introduced along the X2 direction, the magazine 5 is introduced from the second introduction ejector 72. That is, the magazine 5 is set so that the feeder passing groove 533 is located near the upper guide 9 and the positioning groove 531 is located near the lower guide 8. Here, if the worker is going to set the magazine 5 in an opposite direction, the incorrect introduction prevention key 58 is in disagreement with the key grooves 71a and 72a. Therefore, a user recognizes the incorrect introduction, and hence the incorrect introduction is prevented. When the incorrect introduction of the magazine 5 is performed, the incorrect introduction prevention key 58 collides with the front cover 7 as illustrated in FIG. 10, and the magazine 5 cannot advance no more. Therefore, the user can recognize immediately the incorrect introduction. In another embodiment of the incorrect introduction, the connecting shaft guide groove 83 and the connecting hook guide groove 85 are in disagreement with the connecting shaft 54 and the connecting hook 55, and hence the user recognizes immediately the incorrect introduction.

Referring to FIG. 3, in a state where the magazine 5 is closed, the connecting hook 55 of each magazine cell 53 engages with the connecting boss 534 of the adjoining magazine cell 53 and the magazine 5 becomes the locked state. Moreover, in the magazine cells 53 of the magazine 5, the lateral slip prevention convex portion 536 formed on the side surface of one magazine cell 53 is inserted into and engaged with the lateral slip prevention concave portion 537 formed on the side surface of another opposite magazine cell 53. Thereby, in the state where the magazine 5 is closed, the magazine cells 53 are not separated or shifted and is not scattered, and hence the magazine 5 can be stably treated.

(2) Loading of Magazine

As described above, the user can introduce the magazine 5 from either the X1 direction or the X2 direction. In the following description, a case where the magazine 5 is introduced from the X1 direction is explained. Here, the basic action of the magnetic tape device 1 in the case where the magazine 5 is introduced from the X2 direction is the same as that of the magnetic tape device 1 in the case where the magazine 5 is introduced from the X1 direction.

Figure 12:
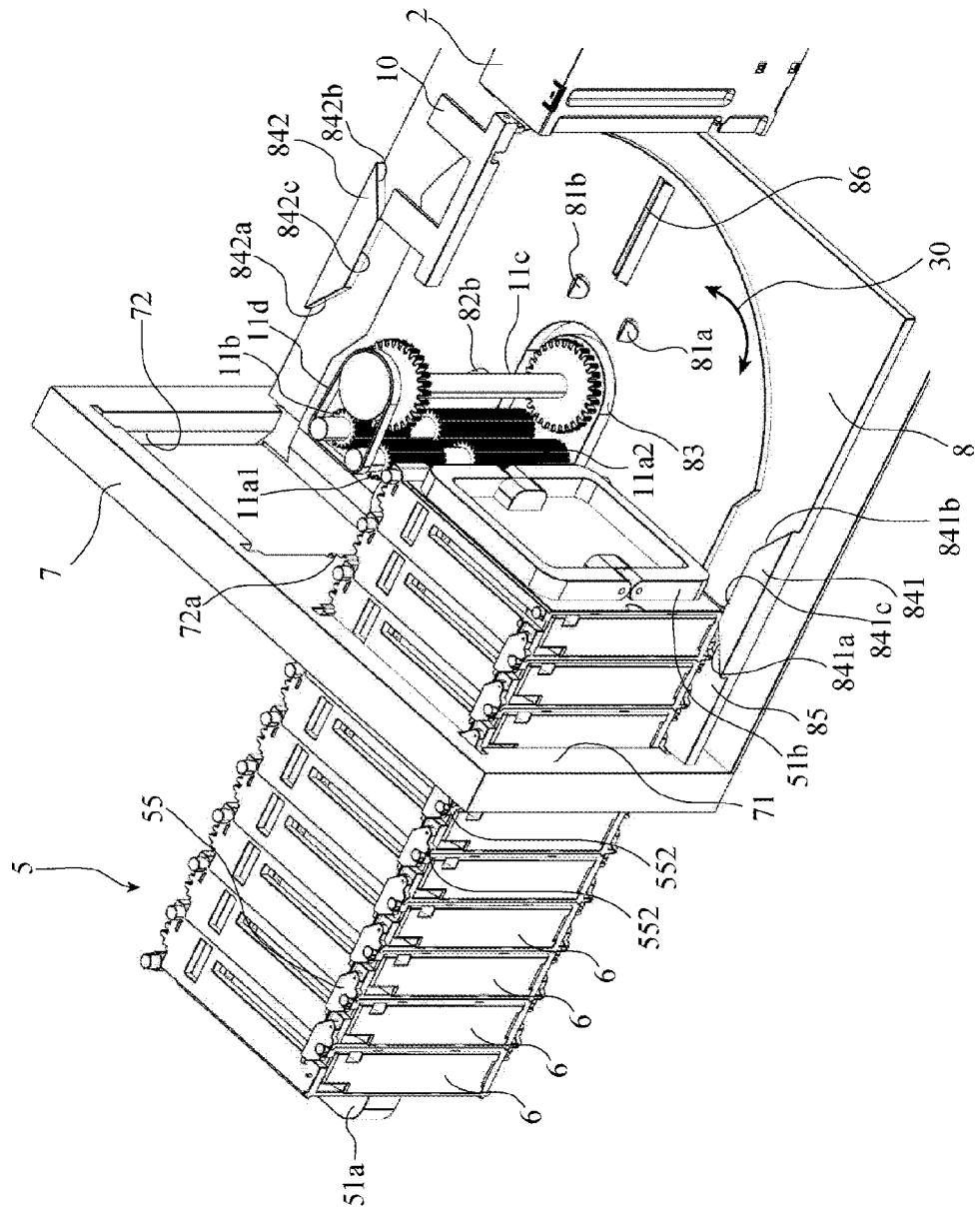
FIG. 12 is a partial perspective view illustrating a state where the magazine is introduced into the cartridge auto-loader as the example of the embodiment.
Figure 16A:
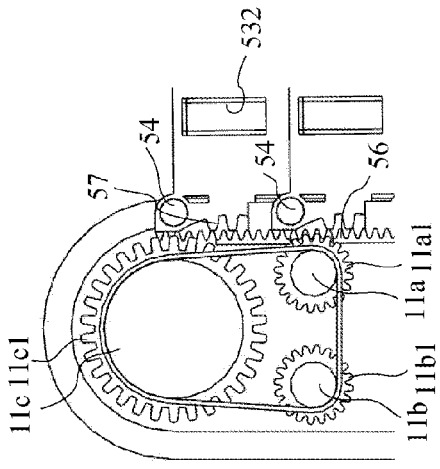
FIGS. 16A to 16E are explanatory diagrams illustrating a state where the magazine is introduced into the cartridge auto-loader by the driving device.
Figure 16B:
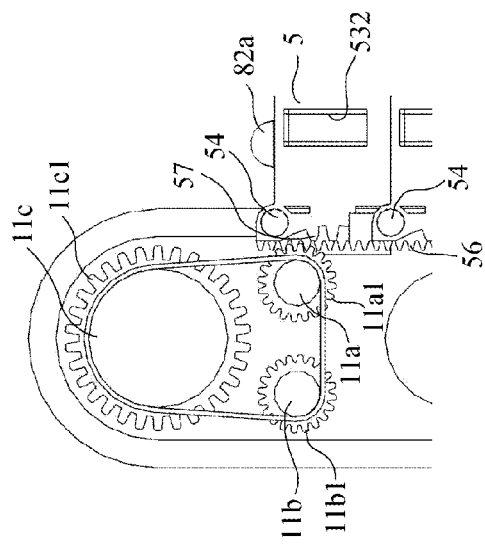
Figure 16C:
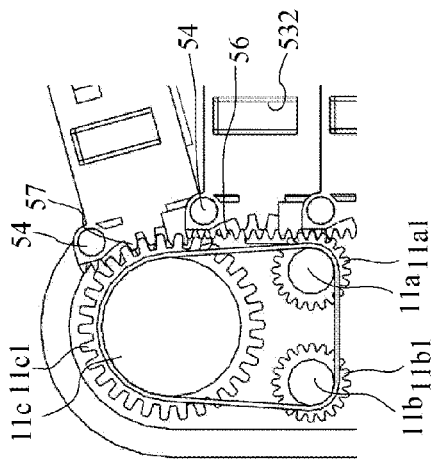
Figure 16D:
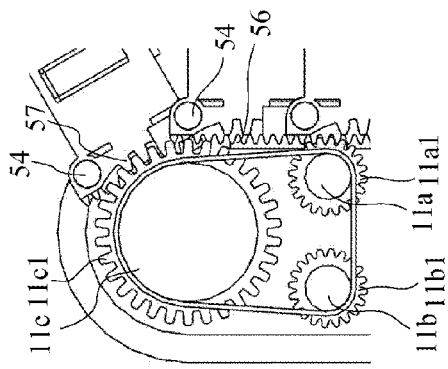
Figure 16E:
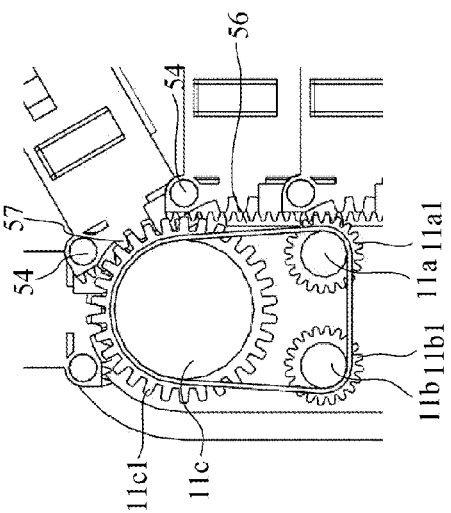

The user inserts the magazine 5 from the leading magazine cell 53 into the first introduction ejector 71 formed on the front cover 7 of the cartridge auto-loader 100, as illustrated in FIG. 11. When the magazine 5 is introduced from the first introduction ejector 71, the rack gears 56 illustrated in FIG. 3 formed on the rear surface of the magazine 5 engage with the first gear 11a1 and the second gear 11a2 of the first driver 11a, as illustrated in FIG. 12. Moreover, the bottom surface of the magazine 5 pushes down the first magazine introduction sensor 82a located on the conveyance route 30. Thereby, the first magazine introduction sensor 82a becomes an ON state, as illustrated in FIG. 18. The controller 3 which has received an ON signal from the first magazine introduction sensor 82a outputs a driving command to the magazine feeding motor 12. Thereby, the magazine 5 which engages the first gear 11a1 and the second gear 11a2 of the first driver 11a with the rack gears 56 is pulled in the housing 103, as illustrated in FIG. 16A.

In the magazine 5 sequentially conveyed, the rotary gears 57 which the leading magazine cell 53 includes engage with the first gear 11c1 and the second gear 11c2 which the third driver 11c includes, as illustrated in FIGS. 16B to 16E.

In this process, the projections 552 of the connecting hooks 55 which the magazine cell 53 conveyed on the conveyance route 30 includes on the top surface and the lower surface contact the inclined plane 841a of the connection hook release block 841. Each projection 552 moves in the sending direction according to the conveyance in the sending direction of the magazine cell 53, in a state where the projection 552 is pushed to the rear surface side by the inclined plane 841a. The projection 552 is pushed to the rear surface side of the magazine cell 53 by the inclined plane 841a, so that the connecting hook 55 which moves in the sending direction along the inclined plane 841a rotates about the shaft 551. Thereby, the space occurs between the concave portion 553 and the connecting boss 534 which have been in the locked state. The space enlarges according to the movement of the magazine cell 53 in the sending direction. Then, the connecting hook 55 is guided by the inclined plane 841a. When the projection 552 reaches the flat plane 841c, the magazine 5 becomes the opened state.

Then, the magazine cell 53 is conveyed in the sending direction in a state where the unlocked state of the connecting hook 55 is maintained by the flat plane 841c. While the connecting hook 55 contacts the flat plane 841c of the connection hook release block 841 and is conveying, the magazine cell 53 goes into the circular arc portion of the conveyance route 30, and the separation between the ends of the front surface side of the magazine cell 53 and the adjoining magazine cell 53 is begun. Thereby, in the magazine cells 53, while the connecting hook 55 contacts the flat plane 841c of the connection hook release block 841 and is conveying, the engagement of the concave portion 553 and the connecting boss 534 is released (or unlocked). The same action is performed on the upper guide 9. Thereby, the magazine cell 53 is rotatable about the connecting shaft 54.

When the magazine cell 53 is further conveyed on the circular arc portion of the conveyance route 30 in the sending direction, the front surface side of the magazine cell 53 is turned by the circular arc portion of the conveyance route 30, and a distance between the ends of the front surface side of the magazine cell 53 and the adjoining magazine cell 53 is enlarged. When the magazine 5 is further conveyed in the sending direction, the ends of the front surface side of the magazine cells 53 radially spread and invert along the connecting shaft guide groove 83 provided on the lower guide 8 and the connecting shaft guide groove provided on the upper guide 9.

When the magazine cell 53 into which the medium 6 to be accessed is stored reaches the front surface of the tape drive 2 in the circular arc portion of the conveyance route 30, the first magazine ejection sensor 81a becomes the ON state. When the first magazine ejection sensor 81a becomes the ON state as illustrated in FIG. 18, the controller 3 stops the driving device 11. In this position, the positioning block 86 projected from the lower guide 8 is fitted in the positioning groove 531 formed on the bottom surface of the magazine cell 53, and the positioning of the magazine cell 53 is performed. Thereby, the magazine cell 53 is positioned at a feed position so that the insertion slot 535 of the magazine cell 53 is opposed to the insertion slot of the tape drive 2.

After the magazine cell 53 is positioned in front of the insertion slot (i.e., at the feed position) of the tape drive 2, the controller 3 moves the medium 6 between the magazine cell 53 and the tape drive 2 by using the feeder mechanism 10. That is, the medium 6 in the magazine cell 53 is moved to and mounted on the tape drive 2, or the medium 6 in the tape drive 2 is unloaded and moved in the magazine cell 53. For example, the medium 6 in which data access processing by the tape drive 2 has finished is returned to the magazine cell 53 by the feeder mechanism 10. Thus, conveyance, stop, and load/unload are performed sequentially and repeatedly. Here, FIG. 13 illustrates an example of a state where the third magazine cell 53 from a head is located in the feeding position.

Similarly, the magazine cell 53 to be accessed secondly is conveyed by using the magazine feeding motor 12 and the driving device 11 until the magazine cell 53 reaches the feed position, and the positioning of the magazine cell 53 and the movement of the medium 6 by the feeder mechanism 10 are performed.

When the magazine 53 is further conveyed in the sending direction, the end of the front surface side of the magazine cell 53 separated from another adjoining magazine cell 53 in the circular arc portion of the conveyance route 30 comes close to the end of the front surface side of the another adjoining magazine cell 53 so as to close the magazine 5 in the process where the magazine cell 53 goes into the linear route from the circular arc portion of the conveyance route 30. Then, the projection 552 of the connecting hook 55 on the magazine cell 53 which moves inside the connecting hook guide groove 85 in the sending direction is guided by the connection hook release block 842 and is conveyed. After the connecting hook 55 passes through the flat plane 842c of the connection hook release block 842, the connecting hook 55 engages with the connecting boss 534 of the adjoining magazine cell 53. The same action is performed on the upper guide 9. The magazine cells 53 which adjoin and engage with each other are fixed by fitting the connecting hook 55 in the connecting boss 534. For example, even if the magazine 5 is opened during the conveyance, malfunction does not occur. In the magazine cells 53 which adjoin and engage with each other, the lateral slip prevention convex portion 536 formed on the side surface of one magazine cell 53 is inserted into and engaged with the lateral slip prevention concave portion 537 formed on the side surface of another opposite magazine cell 53. Thereby, the magazine cells 53 are not unlocked or shifted and are not separated.

Figure 14:
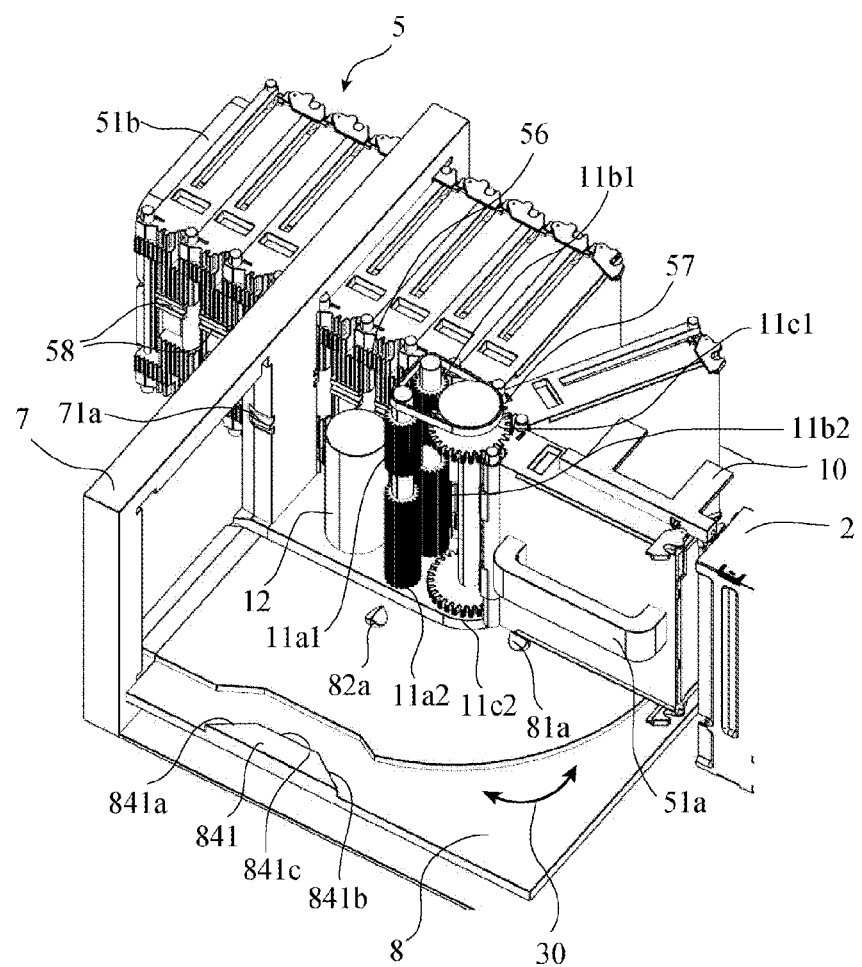
FIG. 14 is a partial perspective view illustrating a state where the magazine is introduced into the cartridge auto-loader as the example of the embodiment.
Figure 15:
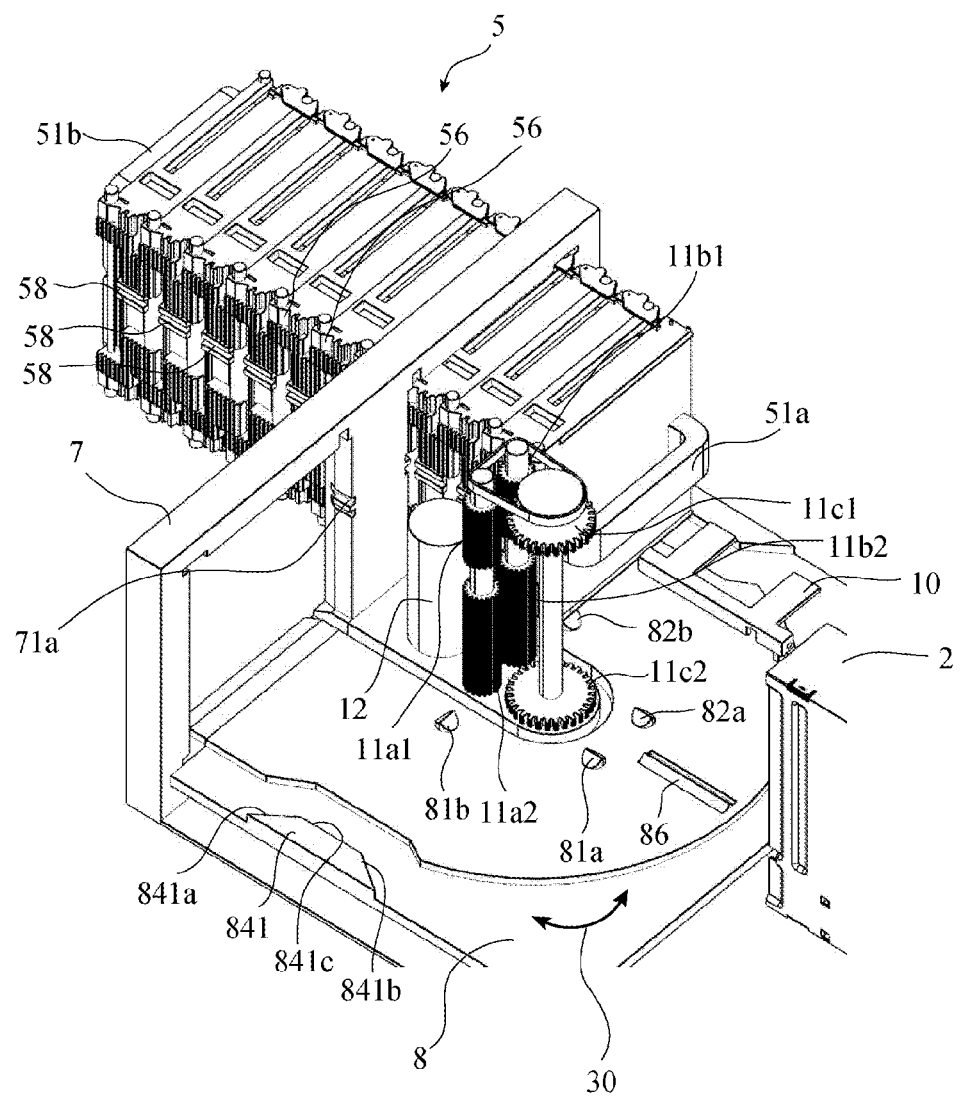
FIG. 15 is a partial perspective view illustrating a state where the magazine introduced into the cartridge auto-loader is ejected as the example of the embodiment.
Figure 17A:
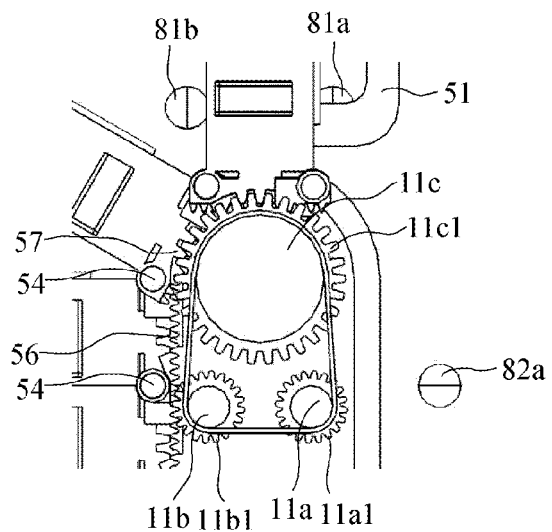
FIGS. 17A to 17C are explanatory diagrams illustrating a state where the magazine is ejected from the cartridge auto-loader by the driving device.
Figure 17B:
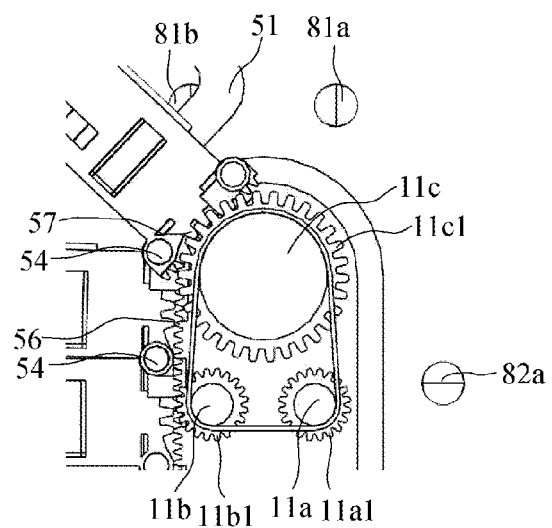
Figure 17C:
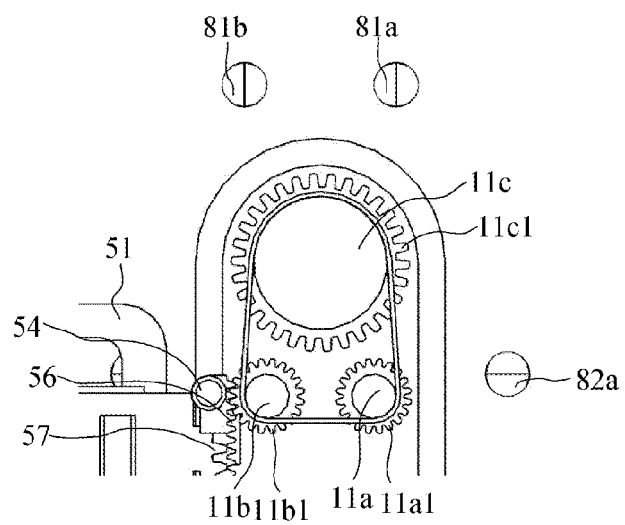

In this process, whenever the second magazine ejection sensor 81b is turned on, the controller 3 determines that a new magazine cell 53 is set, and repeats loading and unloading of the medium 6. Then, when the magazine advances, the second magazine introduction sensor 82b becomes the ON state, as illustrated in FIG. 18. The ON state of the second magazine introduction sensor 82b is continued until a last magazine cell 53 passes through the second magazine introduction sensor 82b, as illustrated in FIGS. 15 and 17C. Here, as illustrated in FIGS. 14 and 17A, the controller 3 can comprehend that the last magazine cell 53 has passed through the linear route of the conveyance route 30, by detecting that the last magazine cell 53 has passed through the first magazine ejection sensor 81a, and/or detecting the OFF state of the first magazine introduction sensor 82a. Then, the controller 3 can comprehend that the last magazine cell 53 has passed through the circular arc portion by detecting the ON state of the second magazine ejection sensor 81b. Then, the controller 3 can comprehend that all magazine cells 53 have passed through the conveyance route 30 and the magazine 5 has becomes a dischageable state, by detecting the OFF state of the second magazine introduction sensor 82b. Then, the controller stops a driving command to the driving device 11.

That is, after the processing in the tape drive 2 to all the media 6 is finished, the magnetic tape device 1 according to the present embodiment can eject the magazine 5 without reversing the magazine 5, and hence the ejection time of the magazine 5 can be shortened.

As described above, an example where the magazine 5 is introduced from the first introduction ejector 71 is explained. Also when the magazine 5 is introduced from the second introduction ejector 72, the magnetic tape device 1 operates as described above. Therefore, the ejection time of the magazine 5 can be shortened.

Thus, according to the magnetic tape device 1 equipped with the cartridge auto-loader 100 as an example of the embodiment, the magazine 5 which can be in a bending state is used. Therefore, a dead space does not arise in an upper part and an lower part of the magnetic tape device 1, and space efficiency improves.

That is, when the magnetic tape device 1 is used as a rack mount, the space saving can be realized and a rack space can be utilized effectively. Moreover, also with respect to a horizontal direction, the size of the magnetic tape device 1 in a depth direction can be made small, and space efficiency can be improved.

When the magazine 5 is configured by connecting the magazine cells 53 of the arbitrary number through the connecting shafts 54, the number of magazine cells 53 to be used can be changed arbitrarily. Therefore, extendibility and convenience of the magazine 5 can be improved, and the magazine 5 can be employed economically and efficiently.

Moreover, in the magazine 5 configured by hinge-connecting the rear surfaces of the magazine cells 53, the magazine cells 53 which adjoin each other are configured so that the connecting hook 55 and the connecting boss 534 provided on the front surfaces of the magazine cells 53 are connectable to each other. Thereby, in a state where the magazine 5 is closed, the magazine 5 can be treated stably, and convenience of the magazine 5 improves. In the conveyance route 30 having the circular arc portion of the magazine 5 in the cartridge auto-loader 100, the connection hook release blocks 841 and 842 are formed at positions before the conveyed magazine 5 approaches the circular arc portion. Each of the connection hook release blocks 841 and 842 opens the connecting hook 55 of the magazine cell 53 just before the circular arc portion of the conveyance route 30, and unlocks the magazine cell 53. Thereby, the magazine 5 can be bent via the connecting shaft 54 along the circular arc portion of the conveyance route 30, and the magazine 5 can be conveyed along the conveyance route 30 having the circular arc portion.

In addition, since the magazine 5 is moved in one direction from the introduction to the ejection, the ejection time of the magazine 5 can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A medium processing device comprising:
    an information processor that performs at least one of record processing and read processing of information to each of recording media;
    a magazine that includes a plurality of storage units which store the recording media, respectively, the storage units which adjoin each other being rotatably connected via a hinge member;
    a curved conveyance route that guides the magazine and has a shape in which two straight line portions are connected to a circular arc portion;
    a first introduction ejector that introduces or ejects the magazine, and is provided on one end of the conveyance route;
    a second introduction ejector that introduces or ejects the magazine, and is provided on another end of the conveyance route;
    a driving device that conveys, along the conveyance route, the magazine introduced from any one of the first introduction ejector and the second introduction ejector, to a position where the magazine is capable of being ejected from another one of the first introduction ejector and the second introduction ejector; and
    a medium mover that moves each of the recording media between each of the storage units of the conveyed magazine and the information processor.

2. The medium processing device as claimed in claim 1, wherein the driving device includes:
    a first driver that receives the magazine introduced from any one of the first introduction ejector and the second introduction ejector along the conveyance route;
    a second driver that sends, along the conveyance route, the magazine to a position where the magazine is capable of being ejected from another one of the first introduction ejector and the second introduction ejector; and
    a third driver that drives the magazine in a section located between a section where the first driver drives the magazine and a section where the second driver drives the magazine.

3. The medium processing device as claimed in claim 1, further comprising:
    an incorrect introduction prevention device that prevents the incorrect introduction of the magazine.

4. The medium processing device as claimed in claim 1, further comprising:
    a detection device that determines a conveyance state of the magazine on the conveyance route;
    wherein the driving device is drive-controlled based on a signal of the detection device.

5. The medium processing device as claimed in claim 4, wherein the detection device includes:
    a first sensor that is located near the first introduction ejector on the conveyance route; and
    a second sensor that is located near the second introduction ejector on the conveyance route.

6. The medium processing device as claimed in claim 5, wherein the first sensor includes:
    a first magazine introduction sensor that is located near the first introduction ejector, and detects that the magazine has been introduced into the conveyance route; and
    a first magazine ejection sensor that is located in the distance from the first introduction ejector, and detects that an end of the magazine passes through the conveyance route;
    the second sensor includes:
    a second magazine introduction sensor that is located near the second introduction ejector, and detects that the magazine has been introduced into the conveyance route; and
    a second magazine ejection sensor that is located in the distance from the second introduction ejector, and detects that an end of the magazine passes through the conveyance route.

7. The medium processing device as claimed in claim 1, wherein the magazine has both ends equipped with handles.

* * * * *

UNITED STATES PATENT AND TRADEMARK OFFICE
CERTIFICATE OF CORRECTION

PATENT NO. : 8,891,201 B2
APPLICATION NO. : 14/100119
DATED : November 18, 2014
INVENTOR(S) : Ichirou Sakuma It is certified that error appears in the above-identified patent and that said Letters Patent is hereby corrected as shown below:

On the Title Page, insert the following item:

--(30) Foreign Application Priority Data: January 11, 2013 (JP).............2013-003098.--.

Signed and Sealed this
Seventh Day of April, 2015

Michelle K. Lee
*Director of the United States Patent and Trademark Office*